(12) United States Patent
Brittain

(10) Patent No.: US 6,810,414 B1
(45) Date of Patent: Oct. 26, 2004

(54) SYSTEM AND METHODS FOR EASY-TO-USE PERIODIC NETWORK DATA CAPTURE ENGINE WITH AUTOMATIC TARGET DATA LOCATION, EXTRACTION AND STORAGE

(76) Inventor: Dennis A. Brittain, 10026 Via Temprano, San Diego, CA (US) 92124

( * ) Notice: Subject to any disclaimer, the term of this patent is extended or adjusted under 35 U.S.C. 154(b) by 0 days.

(21) Appl. No.: 09/553,669

(22) Filed: Apr. 20, 2000

Related U.S. Application Data

(60) Provisional application No. 60/180,562, filed on Feb. 4, 2000.

(51) Int. Cl.[7] .............................................. G06F 13/00
(52) U.S. Cl. ........................ 709/219; 709/224; 719/329
(58) Field of Search ................................. 709/217, 219, 709/223, 224, 328, 329; 719/328, 329; 707/10, 104

(56) References Cited

U.S. PATENT DOCUMENTS

| | | | |
|---|---|---|---|
| 5,713,019 A | | 1/1998 | Keaten |
| 5,764,906 A | | 6/1998 | Edelstein |
| 5,809,250 A | * | 9/1998 | Kisor ........................ 709/227 |
| 5,893,091 A | | 4/1999 | Hunt et al. |
| 5,895,461 A | | 4/1999 | De La Huerga et al. |
| 5,905,492 A | | 5/1999 | Straub et al. |
| 5,905,866 A | | 5/1999 | Nakabayashi et al. |
| 5,913,214 A | | 6/1999 | Madnick et al. |
| 5,933,531 A | | 8/1999 | Lorie |
| 5,978,807 A | * | 11/1999 | Mano et al. ................... 707/10 |
| 5,983,247 A | * | 11/1999 | Yamanaka et al. .......... 707/526 |
| 6,041,331 A | * | 3/2000 | Weiner et al. ............... 707/103 |
| 6,081,788 A | * | 6/2000 | Appleman et al. ............. 705/14 |
| 6,128,624 A | * | 10/2000 | Papierniak et al. ....... 707/104.1 |
| 6,144,990 A | * | 11/2000 | Brandt et al. ................ 709/203 |
| 6,163,779 A | * | 12/2000 | Mantha et al. ................. 707/10 |
| 6,185,585 B1 | * | 2/2001 | Sequeira ...................... 707/513 |
| 6,272,484 B1 | * | 8/2001 | Martin et al. ................... 707/1 |
| 6,286,046 B1 | * | 9/2001 | Bryant ........................ 709/224 |
| 6,304,864 B1 | * | 10/2001 | Liddy et al. ................... 706/15 |
| 6,311,194 B1 | * | 10/2001 | Sheth et al. ................. 707/505 |
| 6,487,566 B1 | * | 11/2002 | Sundaresan ................. 707/513 |
| 6,510,406 B1 | * | 1/2003 | Marchisio ....................... 709/9 |
| 6,538,673 B1 | * | 3/2003 | Maslov ........................ 345/853 |
| 6,549,896 B1 | * | 4/2003 | Candan et al. ................. 707/2 |
| 6,549,941 B1 | * | 4/2003 | Jaquith et al. .............. 709/219 |
| 8,571,243 | * | 5/2003 | Gupta et al. .................... 707/6 |
| 6,651,059 B1 | * | 11/2003 | Sundaresan et al. ........... 707/6 |

* cited by examiner

Primary Examiner—Viet D. Vu

(57) ABSTRACT

System and methods for automatically capturing and storing data from a network is disclosed. The system and methods include easy-to-use graphical user interfaces; integration with Web browsers; point-and-click selection of data targets; automatic input element parameter substitution to retrieve multiple pages from a single network address; periodic Web page retrieval from network servers at pre-specified intervals; dynamic tag string matching to locate text data on variable format HTML and XML pages; dynamic tree matching to locate data nodes in variable document object model representations of HTML and XML data; intelligent character recognition of graphical HTML or XML elements; graphical database, database table and table record creation; and automatic creation of formatted data files or direct storage to database.

15 Claims, 38 Drawing Sheets

FIG. 23

SYSTEM AND METHODS FOR EASY-TO-USE PERIODIC NETWORK DATA CAPTURE ENGINE WITH AUTOMATIC TARGET DATA LOCATION, EXTRACTION AND STORAGE

CROSS-REFERENCE TO RELATED APPLICATION

This application claims benefit of the priority of U.S. Provisional Application Ser. No. 60/180,562, filed Feb. 4, 2000 and entitled "System and Methods for Easy-to-use Automatic Periodic Internet Data Capture and Storage."

TECHNICAL FIELD

This invention relates to capture and storage of information retrieved from a network.

BACKGROUND

The World Wide Web (WWW) is a collection of Hypertext Mark-Up Language (HTML) documents resident on computers that are distributed over networks such as the Internet. The WWW has become a vast repository for knowledge. Web pages provide information spanning the realm of human knowledge from information on foreign countries to information about the community in which one lives. The number of Web pages providing information over the Internet has increased exponentially since the World Wide Web's inception in 1990. Multiple Web pages are sometimes linked together to form a Web site, which is a collection of Web pages devoted to a particular topic or theme.

Accordingly, the collection of existing and future World Wide Web pages represents one of the largest databases in the world. However, access to the data residing on individual Web pages is hindered by the fact that World Wide Web pages are not a structured source of data. That is, there is no defined "structure" for organizing information provided by the Web page, as there is in traditional, relational databases. For example, different Web pages may provide the same geographic information about a particular country, but the information may appear in various locations of each page and may be organized differently from page to page. One particular example of this is that one Web site may provide relevant information on one Web page, i.e. in one HTML document, while another Web site may provide the same information distributed over multiple, interrelated Web pages.

These problems are not limited to retrieving data from HTML documents distributed over the Internet. Larger organizations have begun building "intranets", which are collections of linked HTML documents internal to the organization. While "intranets" are intended to provide a member of an organization with easy access to information about the organization, the problems discussed above with respect to the WWW apply to "intranets". Requiring members of the organization to learn the data context of each Web page, or requiring them to learn a specialized query language for accessing Web pages, would defeat the purpose of the "intranet" and would be virtually impossible on the Internet.

The periodic retrieval of Web pages and extraction of useful information are hindered by several difficulties that have not been solved by prior art. In particular, a large percentage of Web pages are dynamically created. Those Web pages contain data that depends upon input parameters sent to the Web server. Thus, a single uniform resource locator (URL) may, with appropriate parameters, return many data sets. Further, the pages returned may vary in format. For example, some pages may have additional elements, while other pages have had elements deleted. In addition, valuable information may be contained in graphical elements, such as JPEG or BMP images. This information often does not exist in text form in the page data.

SUMMARY

A method for capturing and storing data from a network includes specifying at least one target data accessible from a network location addressable by a network address. The method also includes capturing the target data from data received from the network location at specified dates and times.

In some embodiments, the method further includes easy-to-use graphical user interfaces; integration with Web browsers; point-and-click selection of data targets; automatic input element parameter substitution to retrieve multiple pages from a single network address; periodic Web page retrieval from Internet servers at pre-specified intervals; target data matching; intelligent character recognition of graphical HTML or XML elements; graphical database, database table and table record creation; and automatic creation of formatted data files or direct storage to database.

The present invention also includes a data capture and storage system. The system includes a graphical interface element configured to display at least one target page. The system also includes a selection device and a processor. The selection device operates to enable selection of target data on the target page for capture and storage. The processor is coupled to the graphical interface element, and is capable of being programmed with a plurality of configurations to locate, extract, and store the target data according to the plurality of configurations.

DESCRIPTION OF DRAWINGS

Different aspects of the disclosure will be described in reference to the accompanying drawings wherein:

FIG. 1 is a main application logic flow in accordance with one embodiment of the present invention;

FIG. 3 is a flowchart of a function to setup input parameter substitution;

FIG. 7 is a flowchart of a data retrieval thread that performs input parameter substitution to generate a set of URLs;

FIG. 8 is a flowchart of a function that retrieves an HTML or XML page from a Web server, locates and extracts data targets, and stores data targets to files or databases;

FIG. 23 shows one example of a database showing contents of the database;

DETAILED DESCRIPTION

Throughout this description, the embodiments and examples shown should be considered as examples rather than as limitations of the invention.

A network data capture and storage system enables periodic data capture from a network such as the Internet. The system also provides storage of the captured information in formatted files or databases. The data capture and storage system performs the retrieval of raw data from Web pages at certain pre-programmed times. The system then locates, extracts, and stores information according to a series of programmed parameters. The system further provides data capture and storage tools in a graphical user interface environment for ease of use. The graphical user interface integrates data capture and storage functions into an easy-to-use package of graphical tools. Those functions include what information should be collected, when should the data be retrieved, and where should the information be stored.

For some embodiments, the graphical menu driven environment includes integration with popular Internet browsers. The use of a browser interface reduces effort required to learn the system. The use of browsers also makes data capture setup a natural extension of the browsing process. The data capture setup can be simplified by using a point-and-click process to select data targets directly from browser's view of the Web page.

Setup of data capture times and input parameter substitutions can be achieved by using graphical menu driven dialogs that lead the user through the process. Therefore, the user does not need prior knowledge of computer programming or databases to use the system. The data capture setup information is dynamically saved when the user enters the information. The information is then automatically reloaded when the system is started, and can be copied for use by others.

In a first aspect of the invention illustrated in FIGS. 1 through 8, an application of a data capture and storage engine is created to illustrate the periodic retrieval of raw data from multiple Web pages. The illustrated aspect includes locating, extracting and storing information contained in the raw data. The engine can concurrently execute multiple instances of data capture and storage.

In a second aspect illustrated in FIGS. 9 through 32, a graphical interface system (FIG. 32) is used to extract information from variable format Web pages. The graphical interface system also enables extraction and recognition of textual information in the graphical elements of Web pages.

Although the descriptions, in connection with FIGS. 9 through 31, utilize Hypertext Mark-Up Language (HTML) examples, the concepts and methods apply equally well to Extensible Markup Language (XML) and other more general Standard Generalized Markup Language (SGML) implementations. XML describes a class of data objects called XML documents that are stored on computers, and partially describes the behavior of programs that process these objects.

Figure 2:
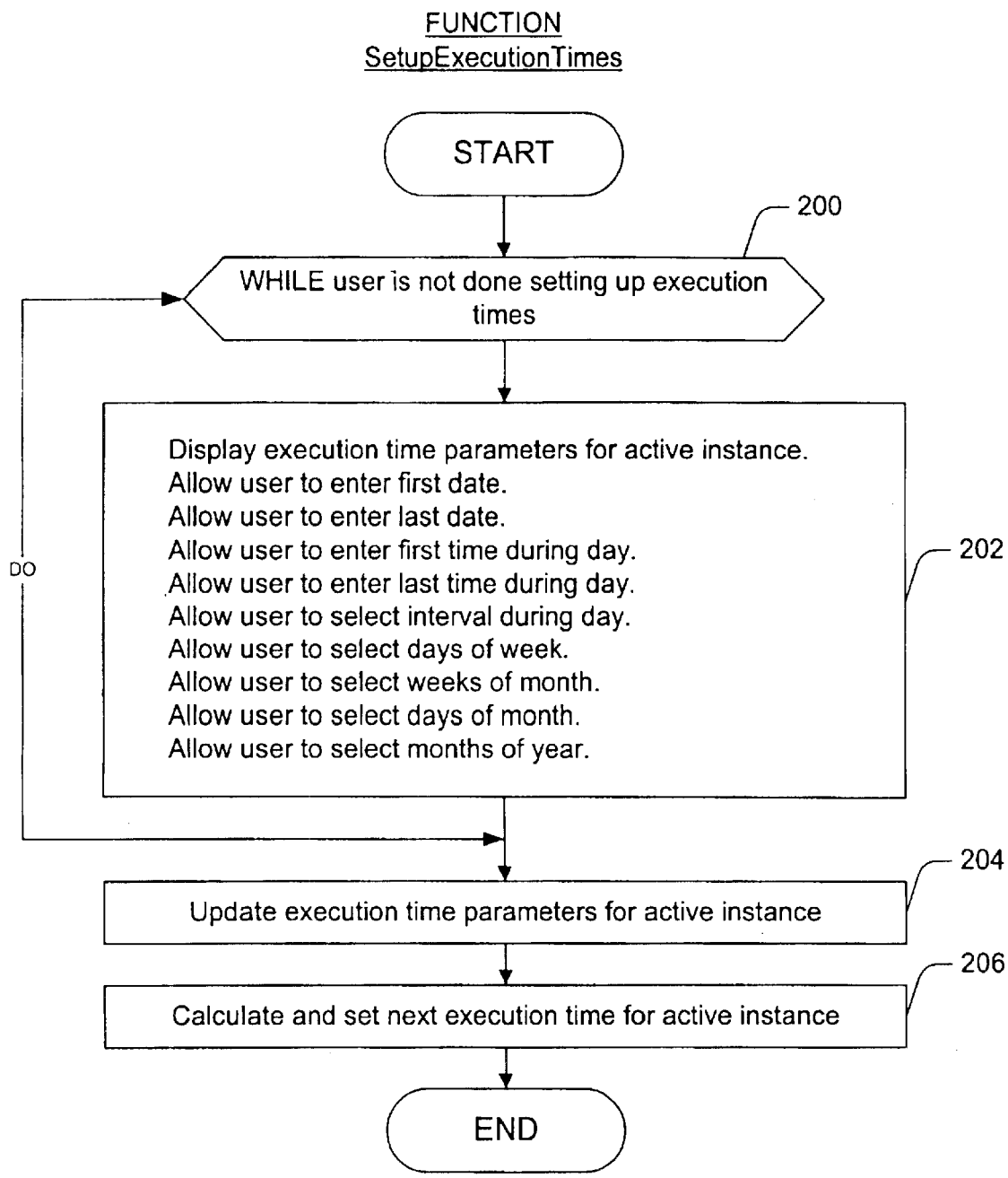
FIG. 2 is a flowchart of a function to setup periodic execution times.
Figure 3A:
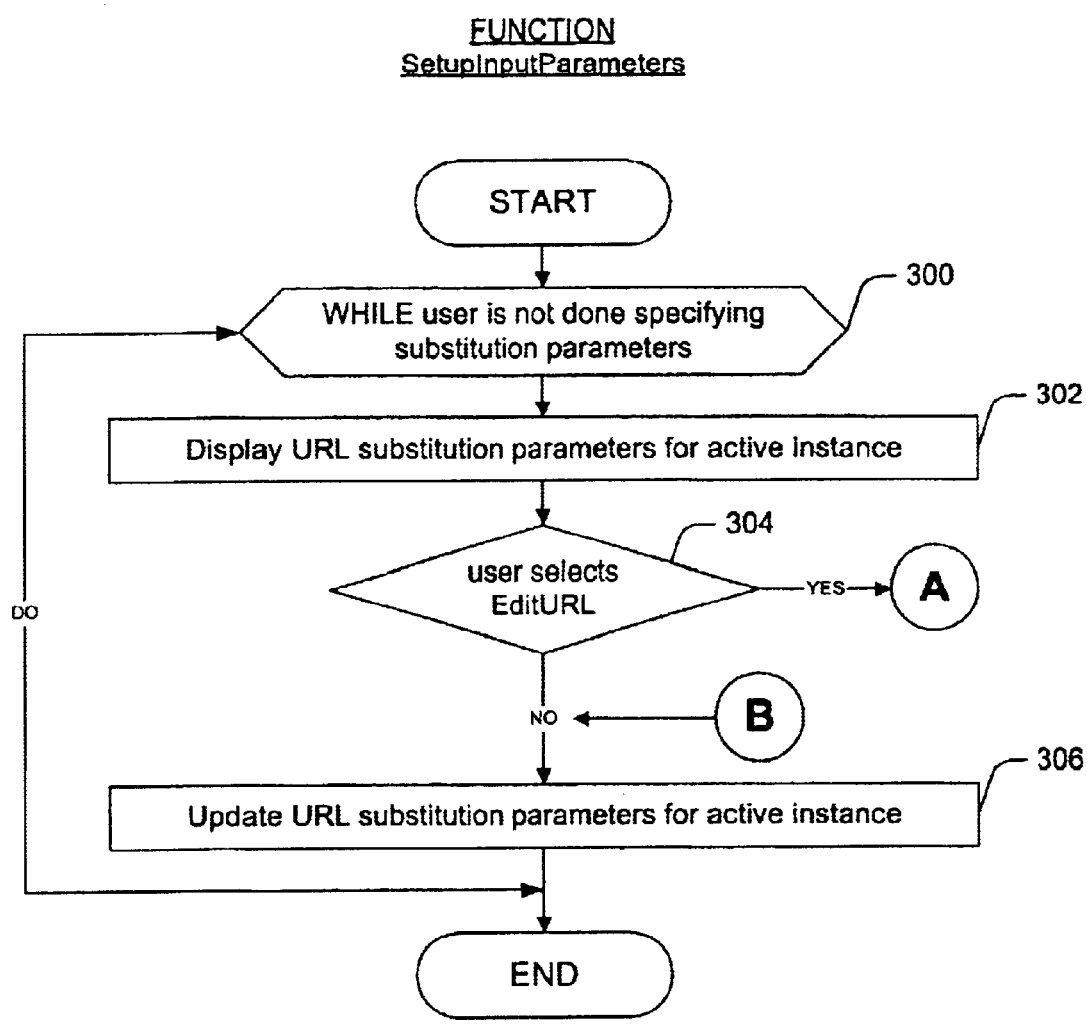
FIGS. 3A, 3B and 3C refer collectively as FIG. 3.
Figure 3B:
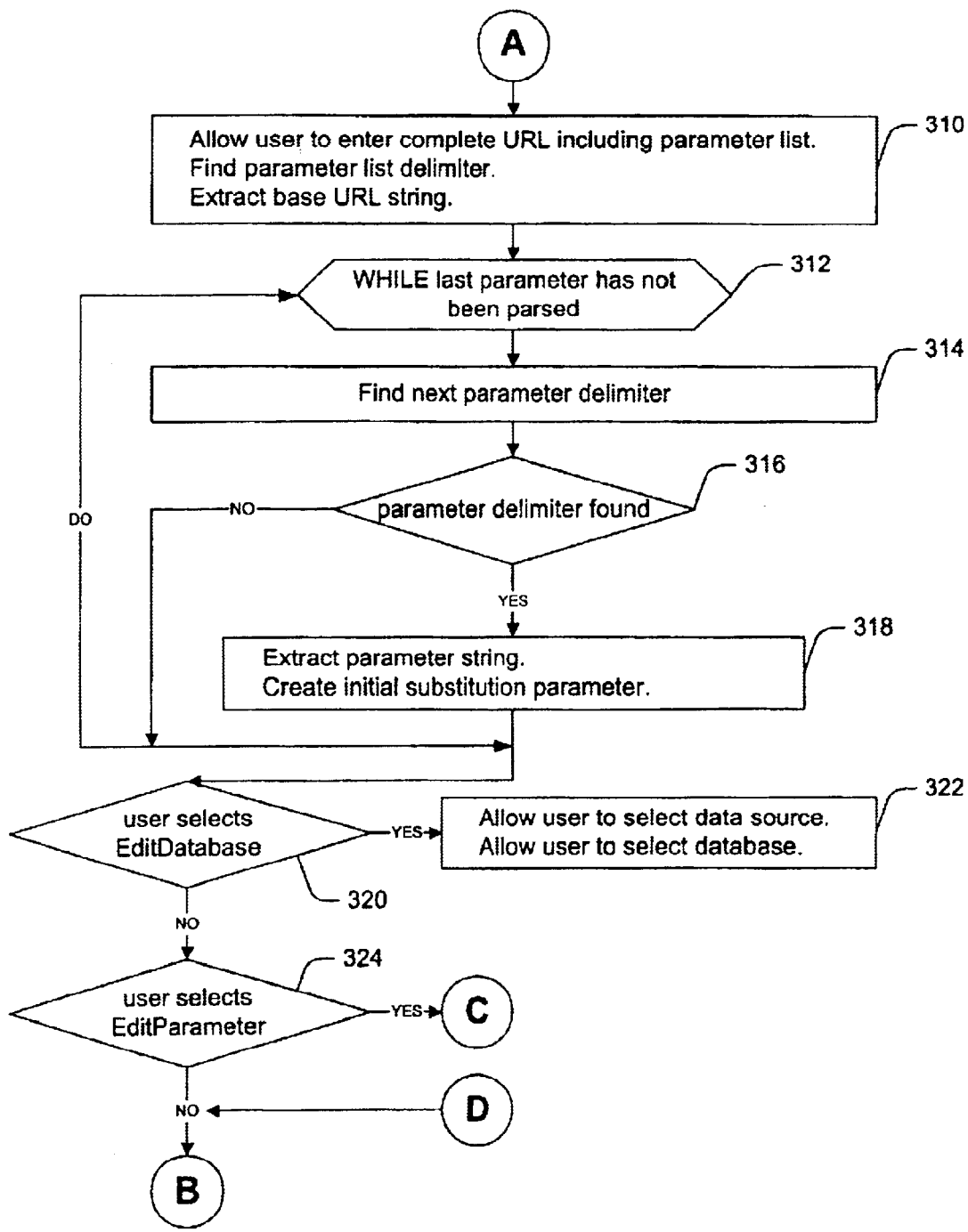
Figure 3C:
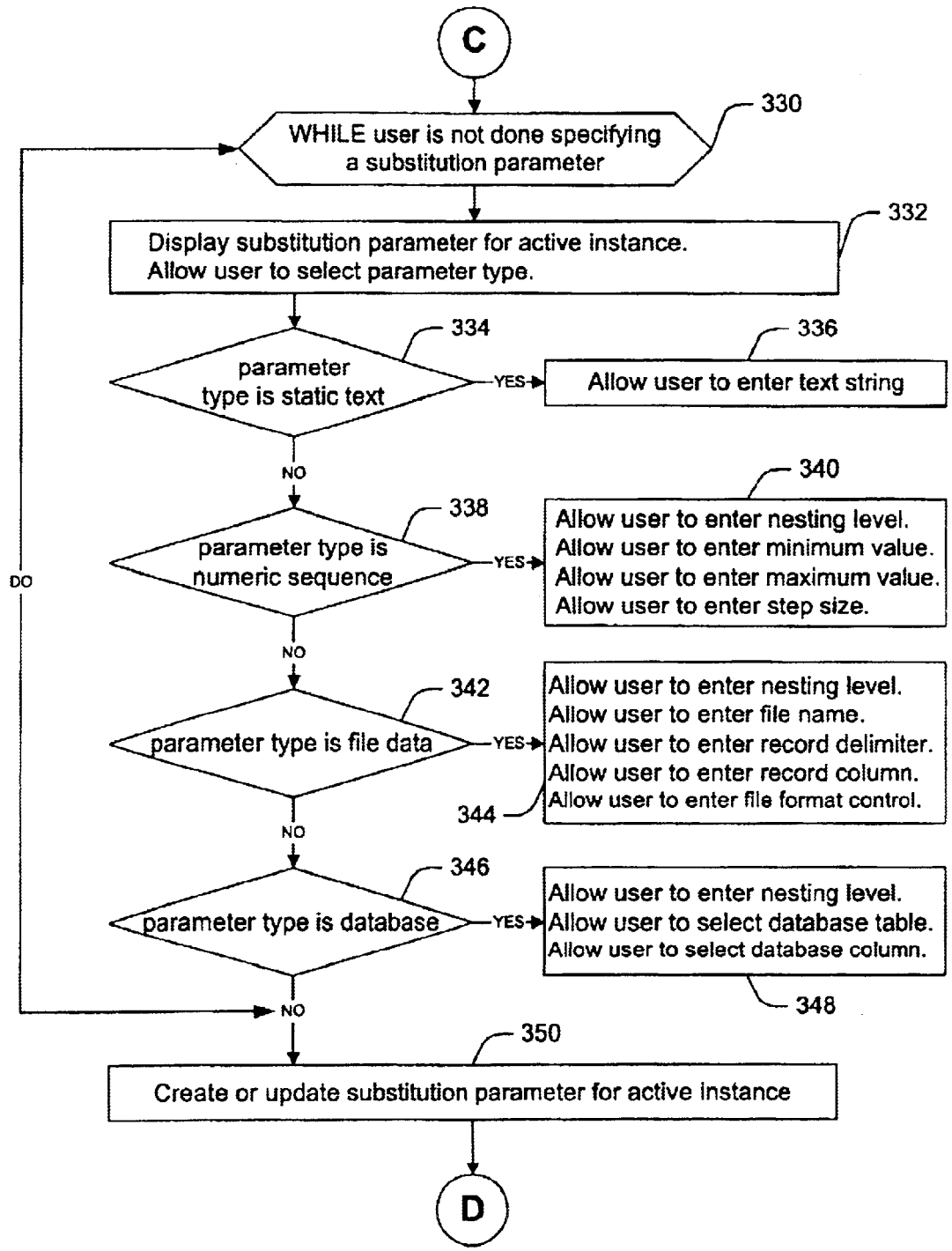

The first aspect of the invention allows creation and configuration of at least one instance of the data capture and storage engine. As shown in FIG. 2, each instance of the data capture and storage engine allows the user to specify a sequence of times to retrieve the HTML or XML data from the Web server. The user can also setup a method for substituting input elements on the Web page as illustrated in FIG. 3. The input elements are elements on Web pages that can be accessed or modified to alter the data displayed on those pages. This allows multiple data sets to be retrieved from the same network address.

Figure 4:
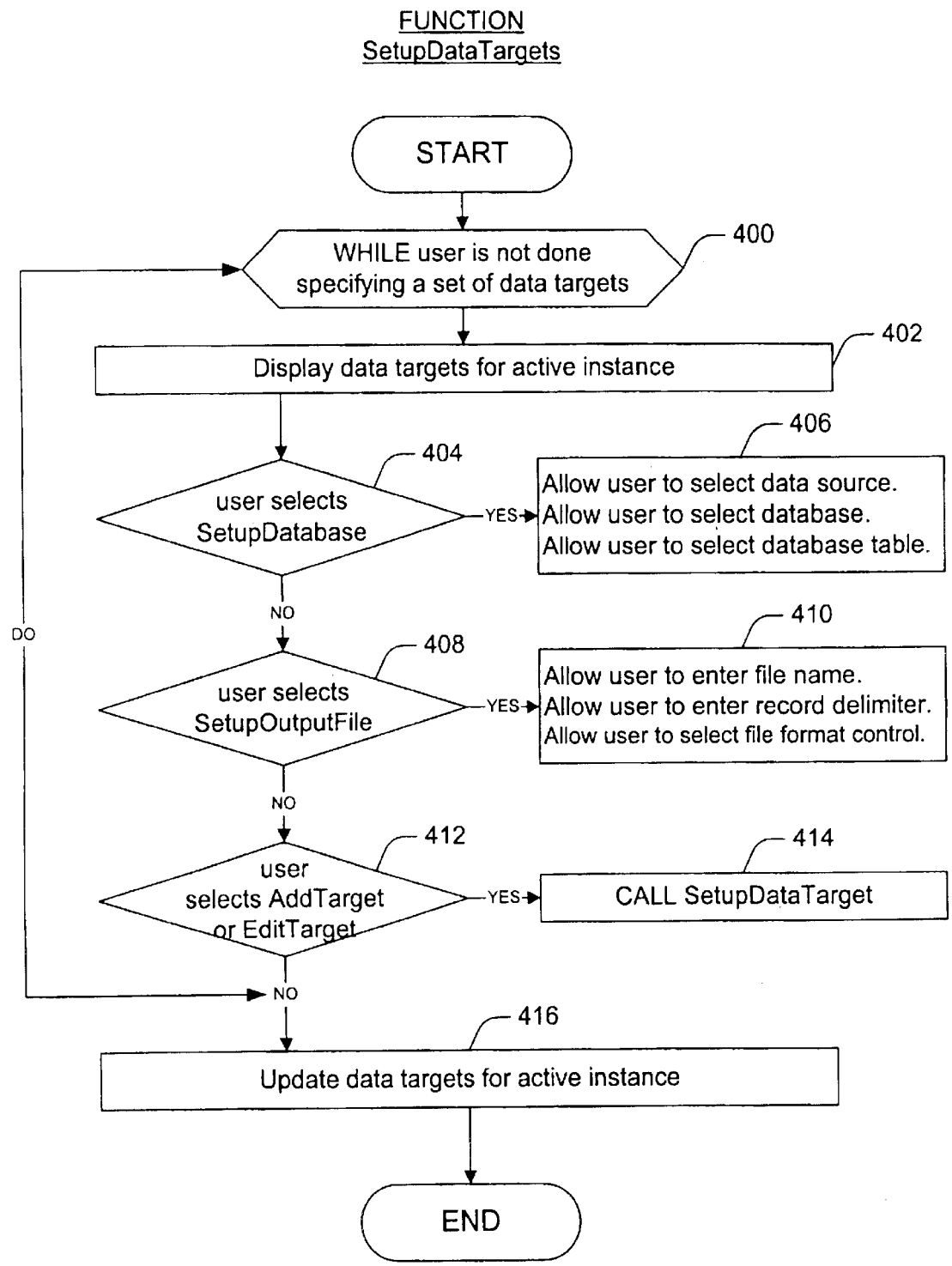
FIG. 4 is a flowchart of a function to setup multiple data targets.
Figure 5:
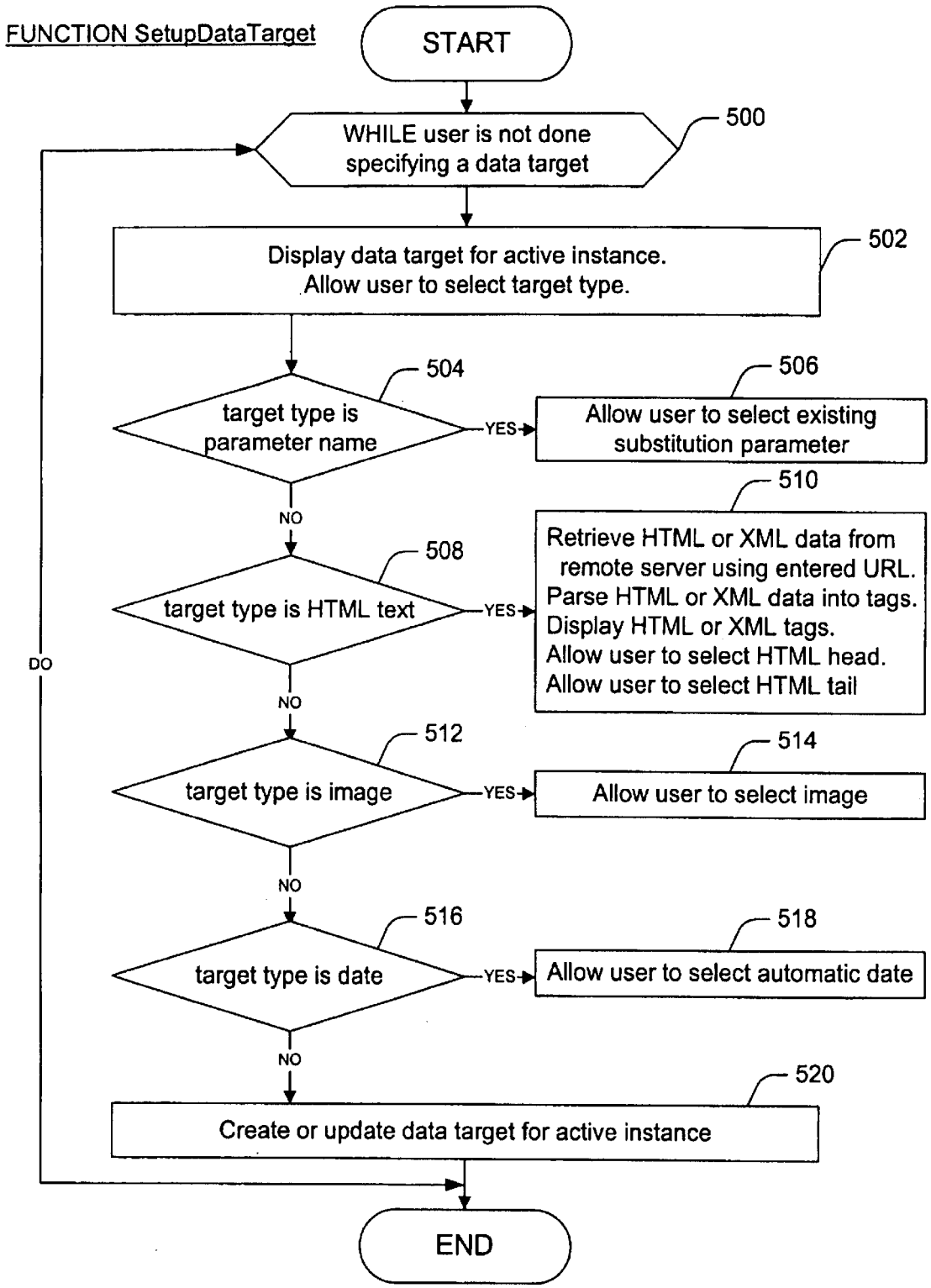
FIG. 5 is a flowchart of a function to setup single data target.
Figure 6:
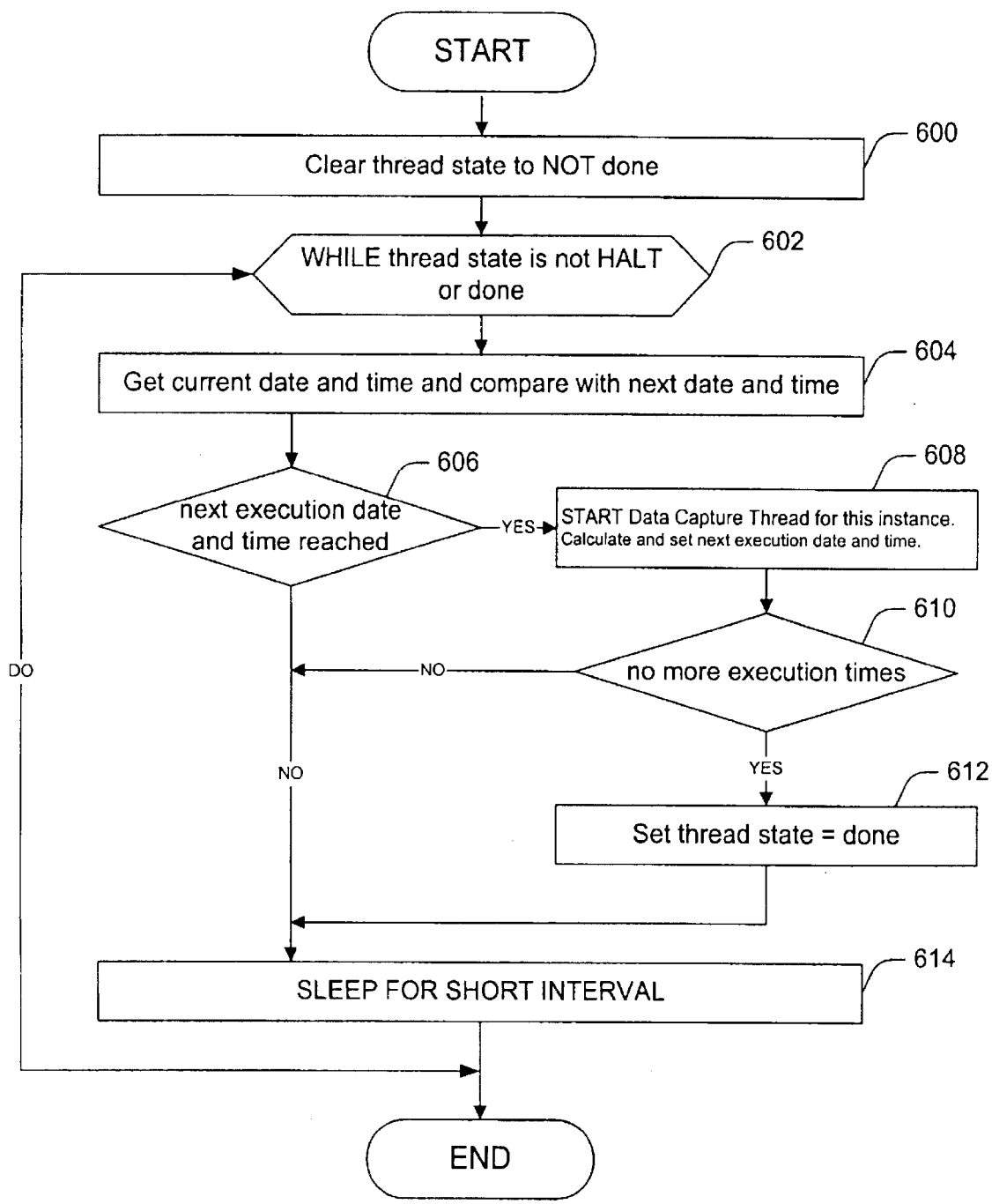
FIG. 6 is a flowchart of an automatic execution thread that waits for next scheduled execution time, and starts a data retrieval thread.
Figure 7A:
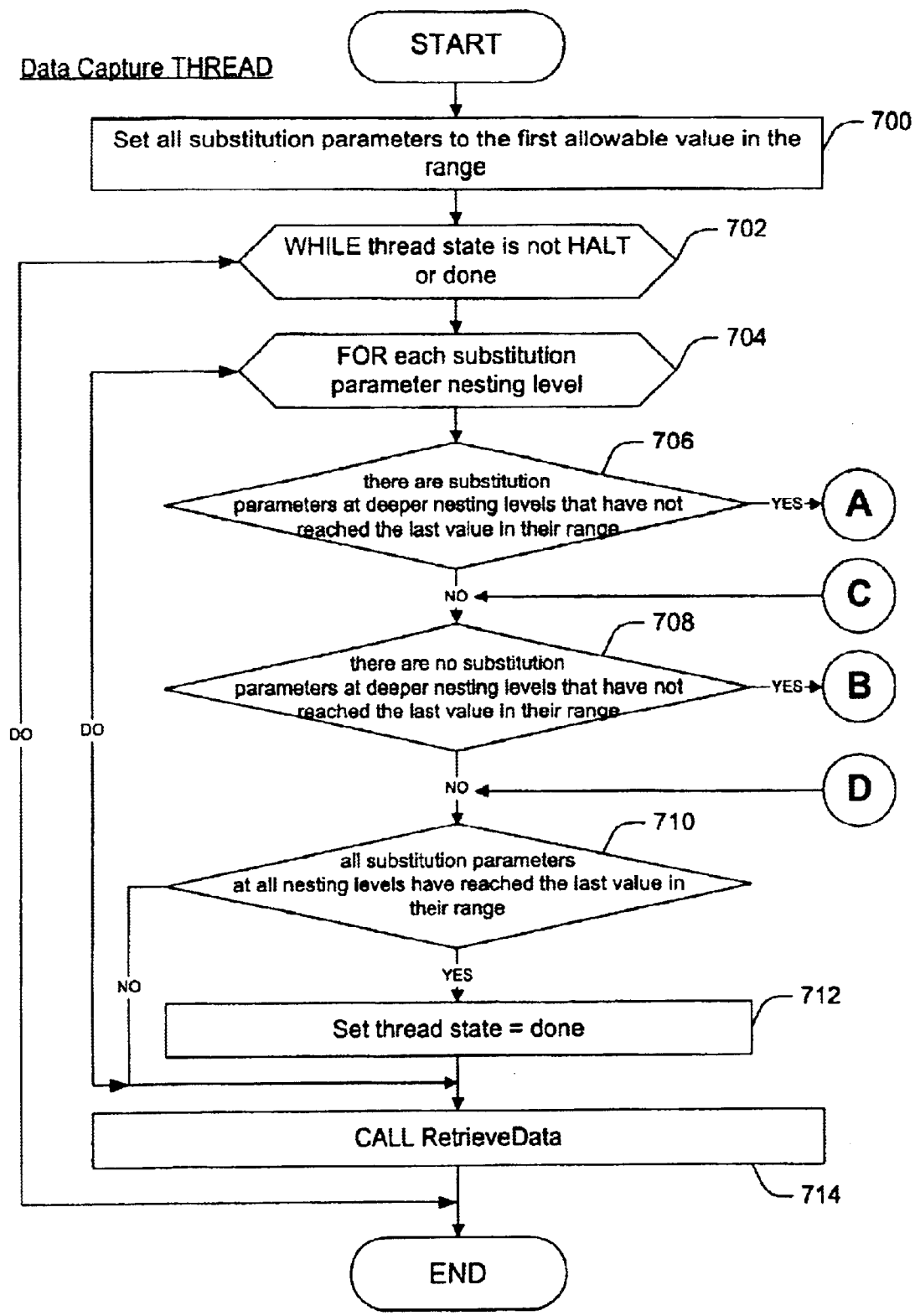
FIGS. 7A, 7B and 7C refer collectively as FIG. 7.
Figure 7B:
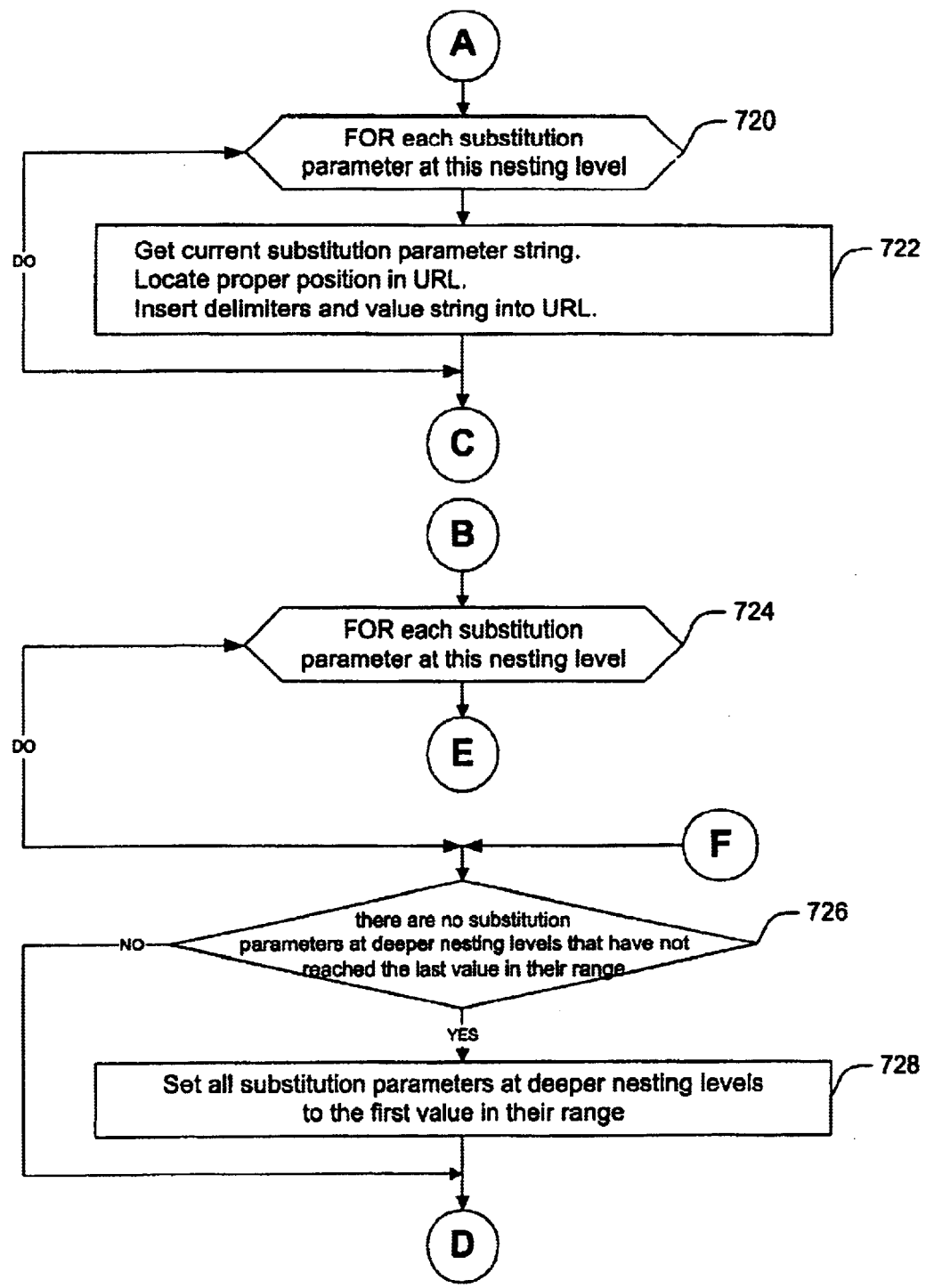
Figure 7C:
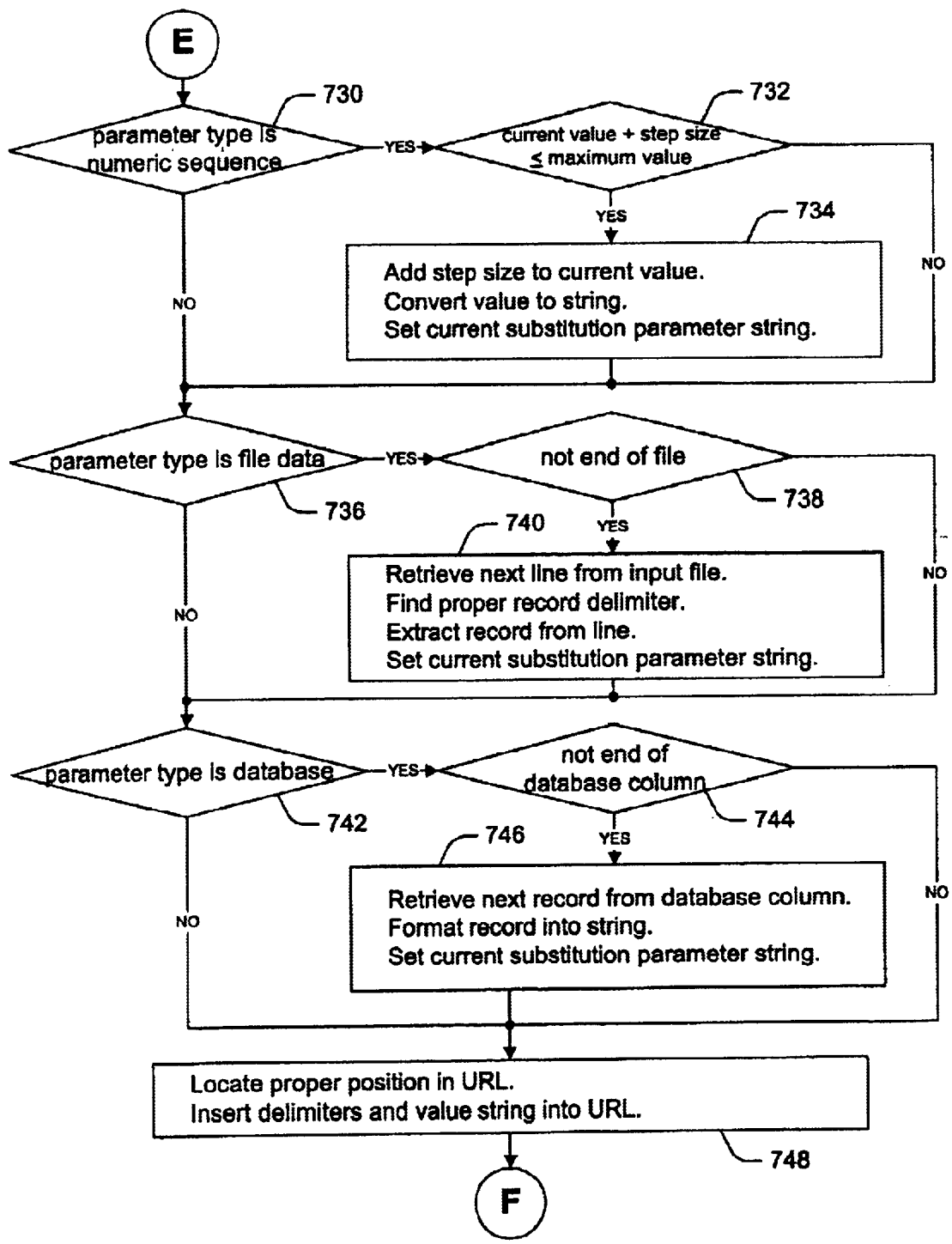
Figure 8A:
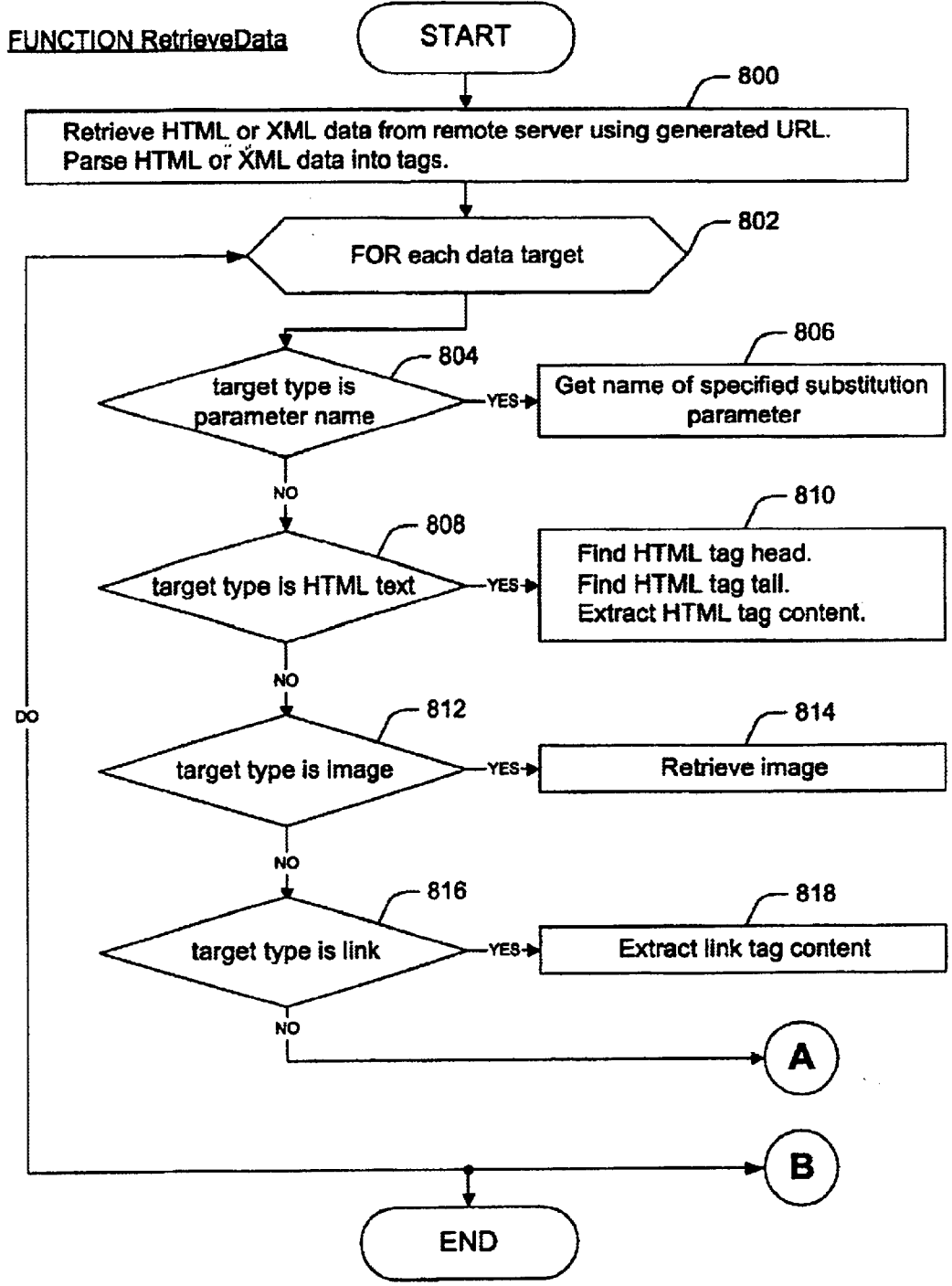
FIGS. 8A and 8B refer collectively as FIG. 8.
Figure 8B:
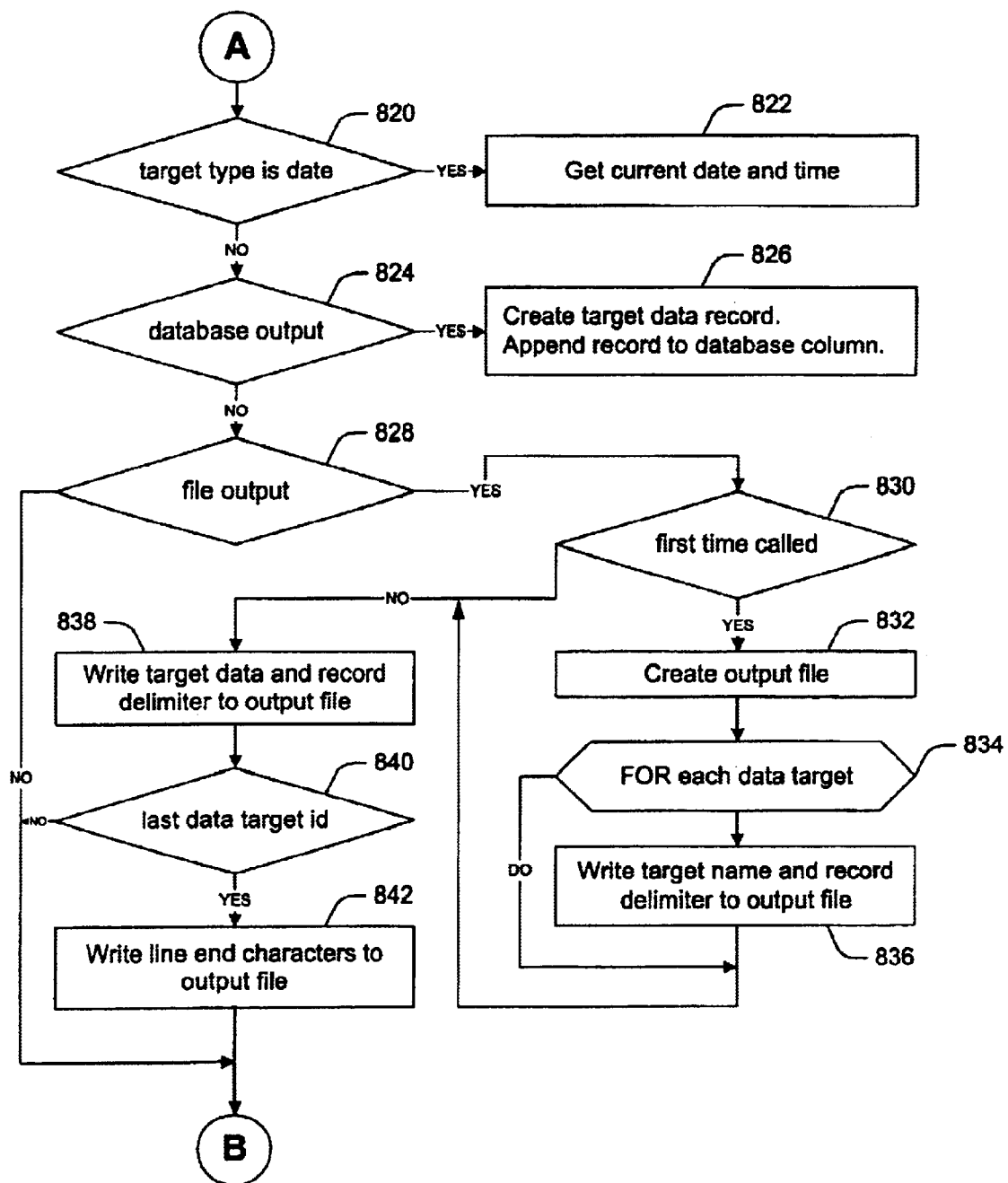

The data capture and storage engine also allows selection of a set of data targets from a Web page, and enables selection of how the data will be stored (FIGS. 4 and 5). The setup information can be saved as it is entered, and can be reloaded when the application is restarted. After the user has setup a particular instance, the data capture and storage engine can be executed immediately with a 'data capture' thread (FIG. 7). In some embodiments shown in FIG. 6, the data capture and storage engine is placed into a wait state until the next specified execution time is reached. This function is executed by a 'waiting-for-next-execution-time' thread. The engine then retrieves, extracts and stores the data (FIG. 8).

Figure 1A:
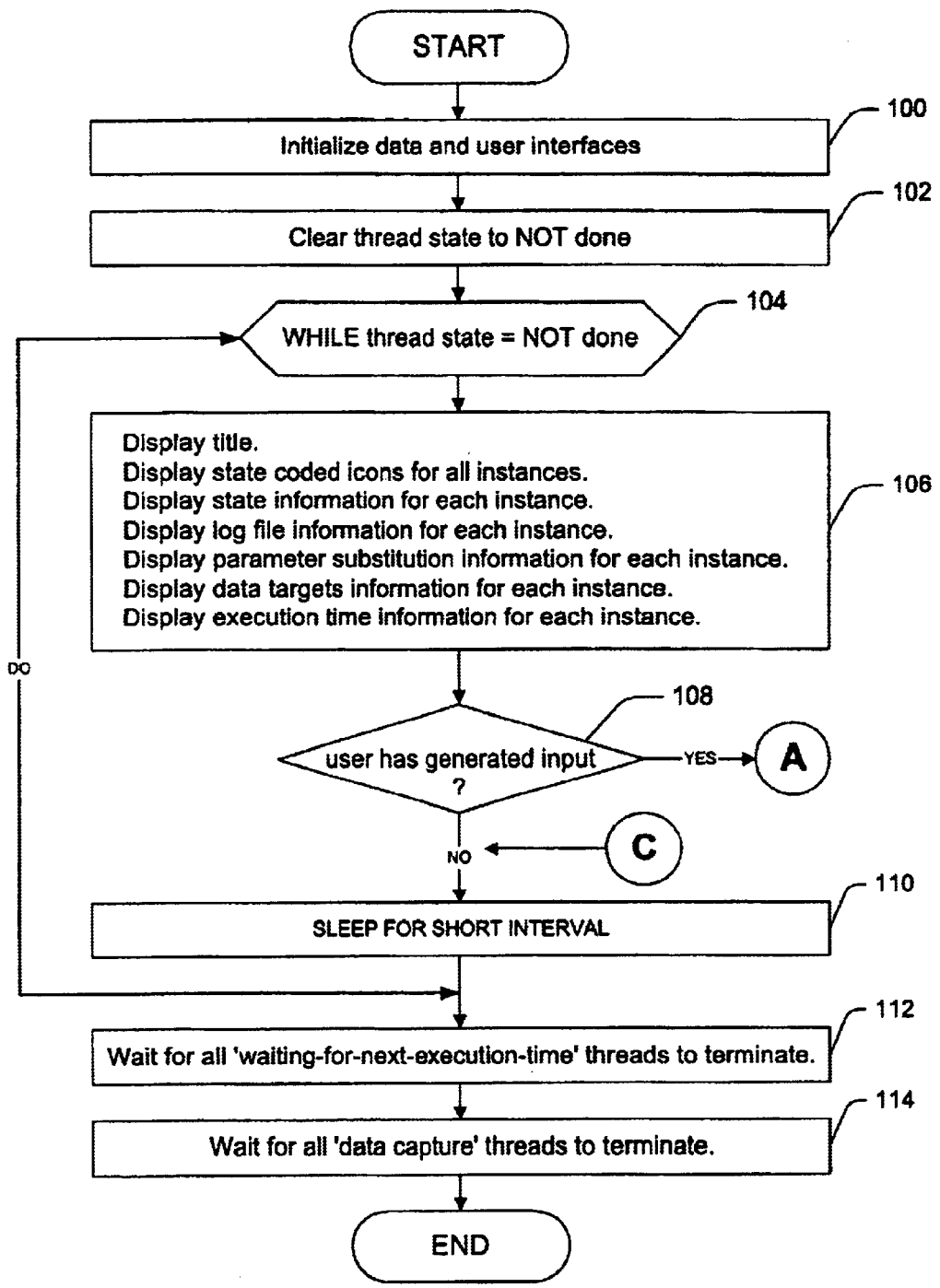
FIGS. 1A, 1B and 1C refer collectively as FIG. 1.
Figure 1B:
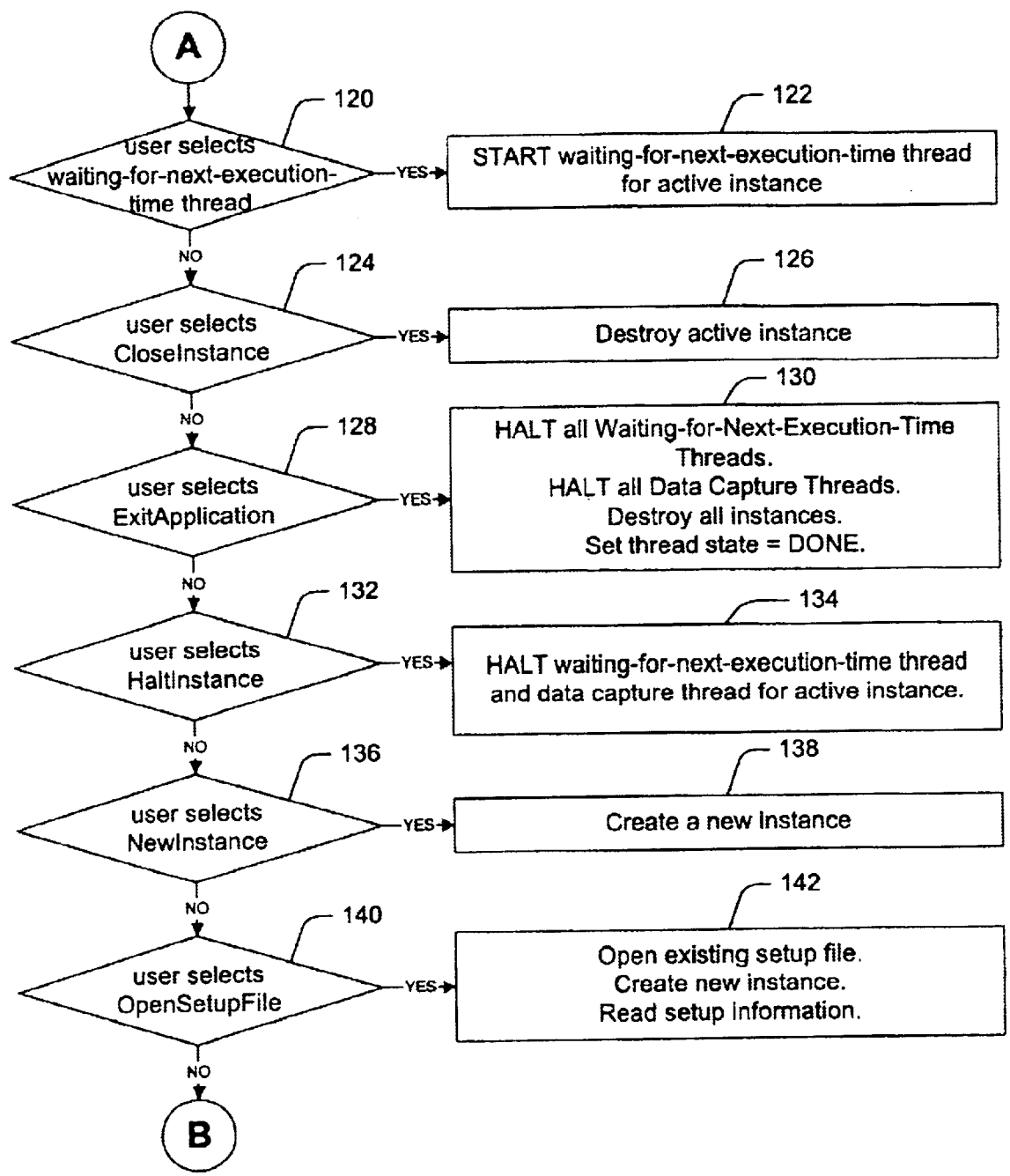
Figure 1C:
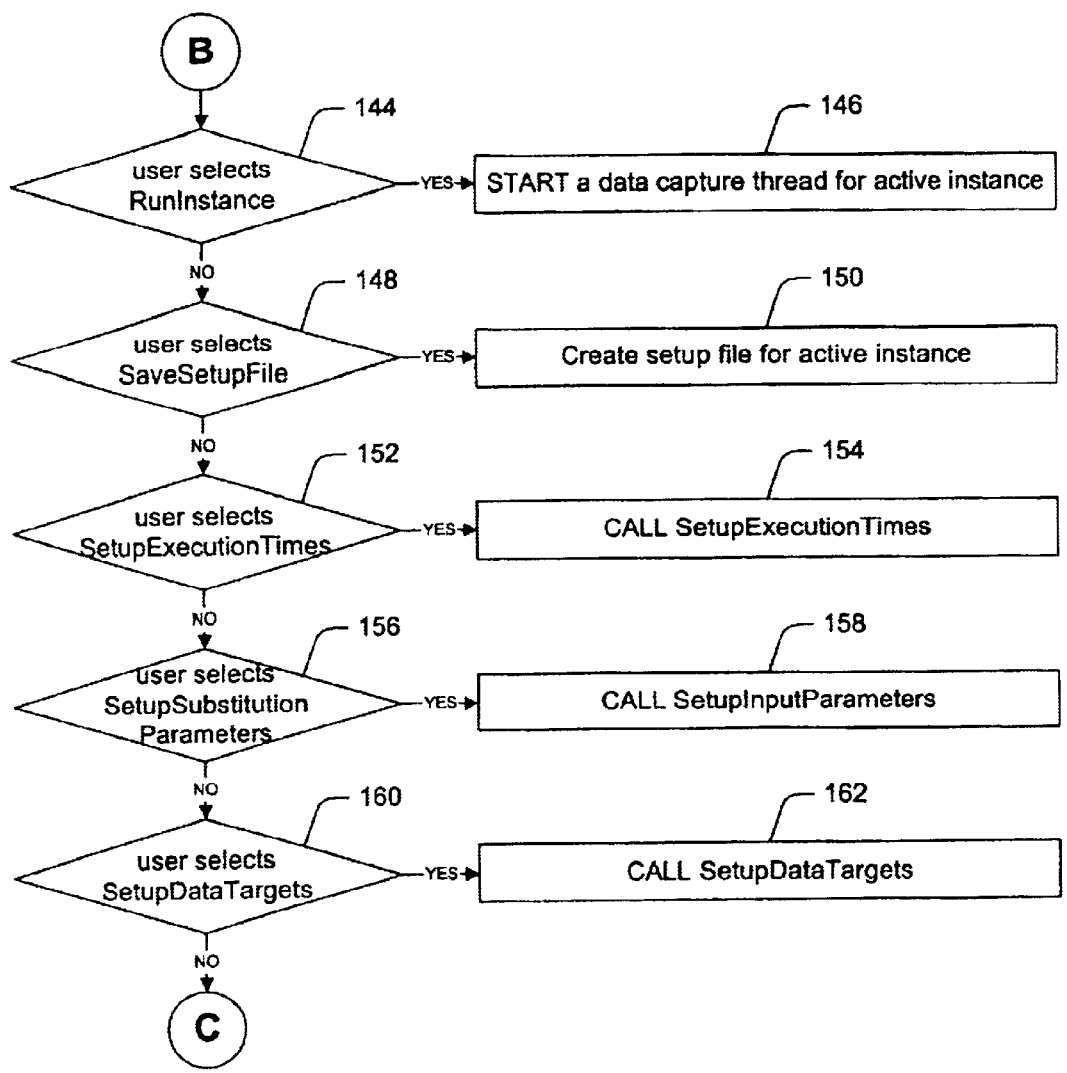

A data capture and storage process is illustrated as a flowchart in FIG. 1 in accordance with one embodiment of the first aspect. The data capture and storage process is sometimes referred to as a thread application. At step 100, the data and user interfaces are initialized. A thread state is then cleared at step 102. While the thread state is indicated as being not done (step 104), process information can be displayed for each instance, at step 106. The process information includes a title, state coded icons, state information, log file information, parameter substitution information, data targets, and an execution time. At step 108, an inquiry is made as to whether the user has generated an input. If the user has generated an input, different actions are taken depending on the user selection. Otherwise, the thread is placed into a sleep state for short duration at step 110. When the thread is done, the application is transitioned into a wait state until all 'waiting-for-next-execution-time' threads 112 and 'data capture' threads 114 terminate.

In the data capture and storage process, the user may choose one of several different selections 120–160. For example, the user may choose to run a 'waiting-for-next-execution-time' thread 120, 122 for an active instance to perform the data capture and storage function (FIG. 6). This thread periodically creates a 'data capture' thread to capture data at programmed times. Other examples of selections include a command to create a new instance 136, a command to open an existing setup file 140, a command to immediately run a data capture thread 144 (FIG. 7), and a command to create a new setup file for an active instance 148. The selections may also include commands to call functions to set data capture execution times 152 (FIG. 2), to specify input element substitution parameters 156 (FIG. 3), and to specify a set of data targets for an active instance 160 (FIG. 4).

FIG. 2 shows one embodiment of a process to set data capture execution times. While the time setup is not finished (step 200), the process allows the user to enter a series of capture time related parameters 202. The capture time related parameters are parameters that define when and for how long the data is to be captured. The parameters include the first date, the last date, the first time during the day, the last time during the day, the time intervals during the day, the days of the week, the weeks of the month, the days of the month, and the months of the year. Once the time setup is finished, the execution time parameters for an active instance is updated at step 204. At step 206, the next execution time for the active instance is calculated and set.

One embodiment of the process to specify input element substitution parameters is shown in FIG. 3. As described above, the input element is an element on a Web page that can be modified to alter the data displayed on that page. For example, a ticker symbol of a particular company can be entered as an input element on a Web page offering stock quotes. When a ticker symbol is entered, stock related information about a company that correlates to the symbol is received and displayed on a browser. Thus, in one embodiment, this process allows capture of stock related information for several different companies specified by the input element substitution parameters.

While the specification of selected substitution parameters is not finished (step 300), the process displays URL substitution parameters for an active instance at step 302. If the user decides to edit the URL at step 304, the process allows the user to edit a series of parameters. In that regard, the process allows the user to enter a complete URL including the parameter list at step 310. The process also finds the parameter list delimiter and extracts the base URL string. While the last parameter has not been parsed (step 312), the process searches for the next parameter delimiter at step 314. If a parameter delimiter is found (step 316), the parameter string is extracted and an initial substitution parameter is created at step 318.

Once the last parameter has been parsed, the process allows the user to select a data source and a database (step 322) if the user decides to setup a database at step 320. If the user decides to edit a substitution parameter at step 324, the process allows the user to enter data while the user has not finished specifying the parameter at step 330. At step 332, the substitution parameter for the active instance is displayed. The process also allows the user to select a parameter type.

If the parameter type is a static text (step 334), the user is allowed to enter text string at step 336. If the parameter type is a numeric sequence (step 338), the process allows the user to enter a nesting level, minimum and maximum values, and a step size, at step 340. If the parameter type is a file data (step 342), the process allows the user to enter a nesting level, a file name, a record delimiter, a record column, and a file format control, at step 344. Otherwise, if the parameter type is a database (step 346), the process allows the user to enter a nesting level, and to select a database table and a database column, at step 348. At step 350, the substitution parameter for the active instance is created or updated.

Finally, the process updates the URL substitution parameters for the active instance at step 306.

FIG. 4 is a flowchart illustrating a process of specifying a set of data targets for an active instance in accordance with one embodiment of the present invention. While the user has not finished specifying a set of data targets (step 400), the data targets for the active instance are displayed at step 402. The user then creates a new data target or modifies an existing one. If the user selects to setup a database at step 404, the process allows the user to select a data source, a database, and a database table, at step 406. If the user selects to setup an output file at step 408, the process allows the user to enter a file name and a record delimiter, and to select a file format control, at step 410. Otherwise, if the user selects to add or edit a data target at step 412, the process calls a data target setup process at step 414. When the user is done specifying a set of data targets, the specified data targets for the active instance are updated at step 416.

FIG. 5 shows a data target setup process. This process allows the user create a new data target or modify an existing one (step 500). At step 502, the data target is displayed, and the user is allowed to select a target type. If the target type is a parameter name (step 504), the user is allowed to select an existing substitution parameter at step 506. If the target type is an HTML text (step 508), the process retrieves HTML/XML data from a remote server using the entered URL at step 510. At this step, the process also parses HTML/XML data into tags, displays the tags, and allows the user to select HTML head and tail. If the target type is an image (step 512), the user is allowed to select the image at step 514. Otherwise, if the target type is a date (step 516), the user is allowed to select an automatic date at step 518. Finally, the data target for the active instance is created or updated at step 520.

A 'waiting-for-next-execution-time' thread to perform the data capture and storage function at a later time is shown in FIG. 6. Initially, the thread state is cleared at step 600. At step 602, the background thread process is performed in a loop while the thread state is not done or halted. Current date and time is obtained and compared with next date and time at step 604. If the next execution date and time is greater than or equal to the current date and time at step 606, a thread to perform the data capture is started immediately at step 608. At this step, next execution date and time are also calculated and set. If there are no more execution times left to process (step 610), the thread state is set to done at step 612. Otherwise, the thread is placed into a sleep state for short interval at step 614.

FIG. 7 shows one embodiment of a thread process that immediately executes a data capture and storage. The substitution parameters are set to the first allowable value in the range at step 700. The thread process is executed in a loop while the thread state is not done or the thread is not halted (step 702). At step 704, the substitution parameters are set for each substitution parameter nesting level. The nested substitution parameters enable data capture and storage at all nesting levels by providing every combination of substitution parameters into the URL.

If there are substitution parameters at deeper nesting levels that have not reached the last value in their range (step 706), a current parameter string is obtained (step 722) for each substitution parameter at this nesting level (step 720). At step 722, a proper position in the URL is located, and delimiters and value string are inserted into the URL, for each substitution parameter at this nesting level. If there are no substitution parameters at deeper nesting level that have not reached the last value in their range (step 708), the parameter type is queried for each substitution parameter at this nesting level (step 724). Otherwise, a data retrieval process is called at step 714.

If the parameter type is a numeric sequence (step 730) and the current value plus the step size is less than the maximum value (step 732), the step size is added to the current value at step 734. Also, the value is converted into a string and the current substitution parameter string is set at step 734. If the parameter type is file data (step 736) and the end-of-file has not been reached (step 738), a next line is retrieved from the input file at step 740. Also, a proper record delimiter is found, the record is extracted from the line, and the current substitution parameter string is set at step 740. If the parameter type is a database (step 742) and the end of database column has not been reached (step 744), a next record from the database column is retrieved at step 746. Also, the record is formatted into a string and the current substitution parameter string is set at step 746. At step 748, a proper position in the URL is located and the delimiters and value string are inserted into the URL.

If all substitution parameters at all nesting levels have reached the last value in their range (step 710), a thread state is set to done at step 712.

FIG. 8 shows a data retrieval process in accordance with an embodiment of the present invention. At step 800, the HTML/XML data is retrieved from a remote server using a generated URL. For each data target at step 802, selected data is retrieved according to the target type.

If the target type is a parameter name (step 804), the name of a specified substitution parameter is obtained at step 806. If the target type is an HTML text (step 808), HTML tag head and tail are searched and an HTML tag content is extracted at step 810. If the target type is an image (step 812), the image is retrieved at step 814. If the target type is a link (step 816), the link tag content is extracted at step 818. If the target type is a date (step 820), the current date and time are obtained at step 822.

If the retrieved data is a database output (step 824), a target data record is created and appended to the database column at step 826. Otherwise, if the retrieved data is a file output (step 828) and this is the first time a data has been retrieved (step 830), then an output file is created at step 832. For each data target at step 834, target name and record delimiter are written to the output file at step 836. If the file output is not called for the first time, target data and record delimiter are written to an existing output file at step 838. If the last data target ID has been reached at step .840, line end characters are written to the output file at step 842.

The second aspect of the present invention provides graphical user interface to solve problems encountered in real world data. The graphical user interface creates a process that enables the user to select data targets directly from browser's view of the Web page using the point-and-click technique. The graphical user interface of the second aspect, illustrated in FIGS. 9 through 31, has the look-and-feel of Microsoft's Internet Explorer™. Although the interface was created using Microsoft development tools and libraries, the scope of this invention includes all implementations that provide similar functionality including other browsers and program development tools. The methods and functionality of the data capture engine are embedded in the regular browser functionality and accessible via menu items and corresponding toolbar buttons. Further, commercially available intelligent character recognition engines can be used by the data capture engine to extract text information from graphical data.

The second aspect also provides a method to create input element sets to handle both <FORM method="get"> and <FORM method="post">, in addition to creating URL strings as previously described with respect to FIG. 7. The method, previously described to find target elements based upon bounding character sequences, has been improved with additional methods to locate elements based upon dynamic tag string matching and dynamic document object model tree matching. The second aspect also includes a method for retrieving bitmap data such as BMP, JPEG or other bitmap data formats. Intelligent character recognition can be applied to extract text information from graphical elements.

Figure 9:
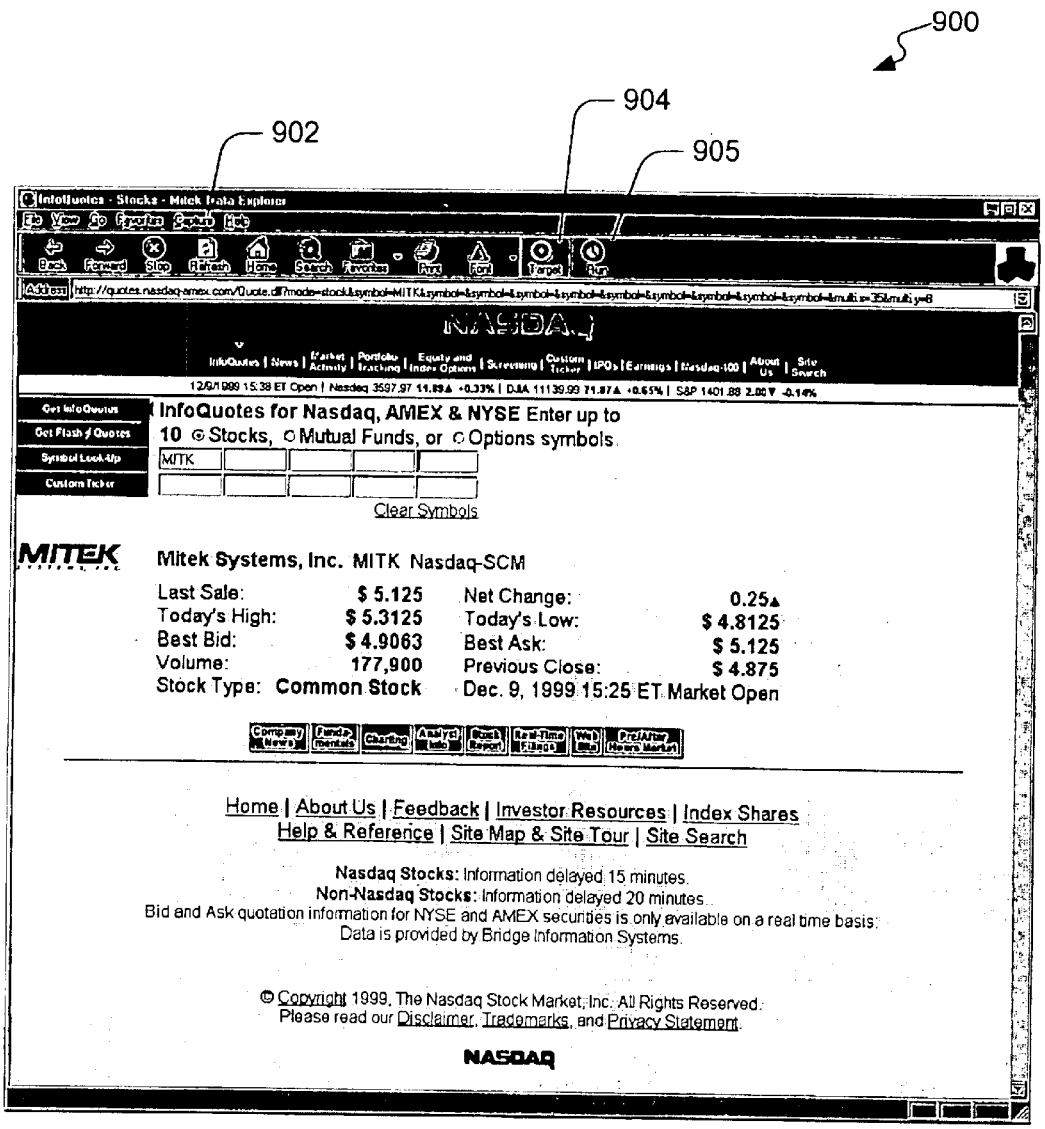
FIG. 9 shows one embodiment of a user interface browser mode.

FIG. 9 illustrates one embodiment of a browser mode 900. The user can enter the data target setup mode, or turn automatic data collection on and off using the appropriate menu items 902, or corresponding toolbar buttons 904 and 905. The data capture system graphically highlights certain elements on the browser view upon entering the targeting mode. All of the input elements are located on the page. The input elements are outlined, marked, numbered, and added to the input parameter list for possible substitution. Since HTML elements can be nested, a single pixel on the display may be associated with a set of HTML elements. Nested elements that can be associated with the cursor position are outlined as the cursor is moved during target selection.

Figure 10:
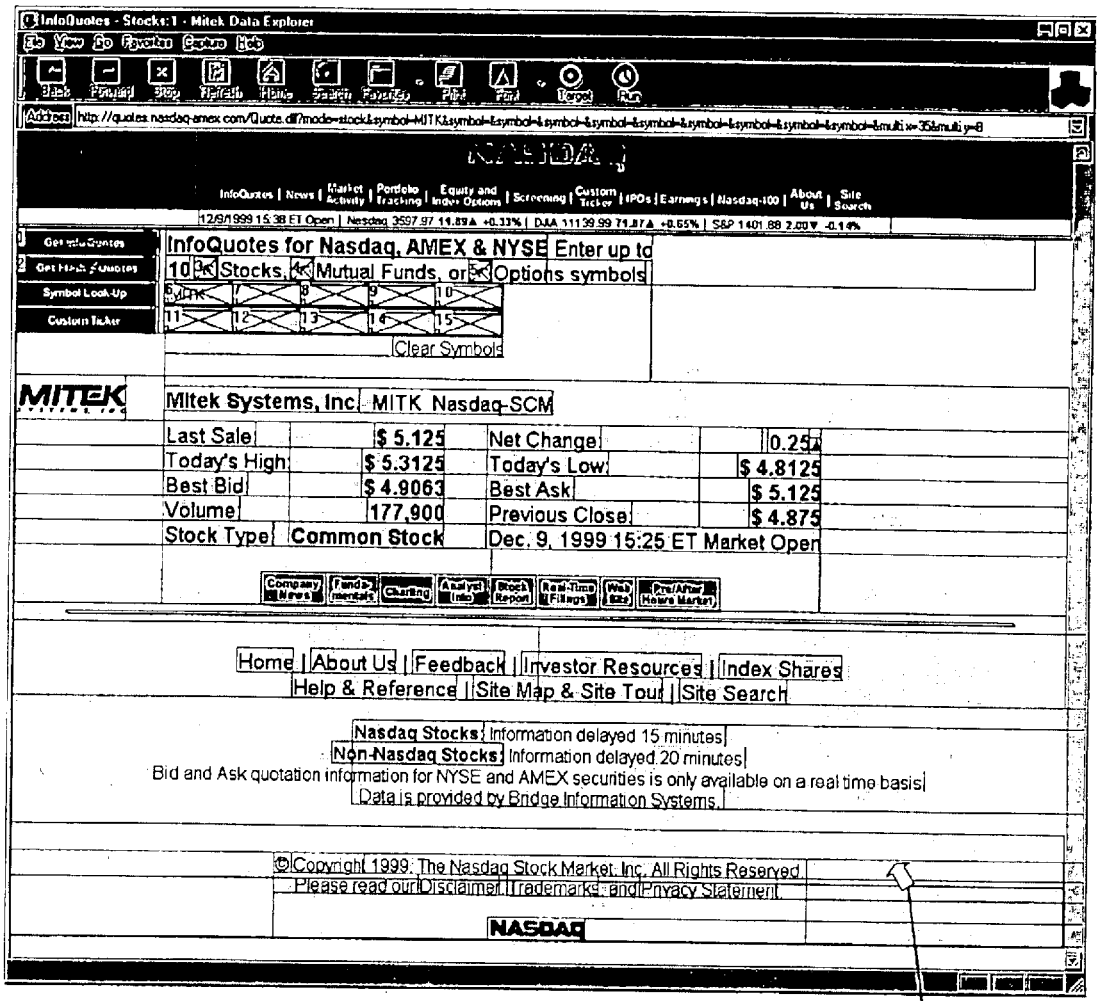
FIG. 10 shows one embodiment of a user interface targeting mode with all elements highlighted.
Figure 11:
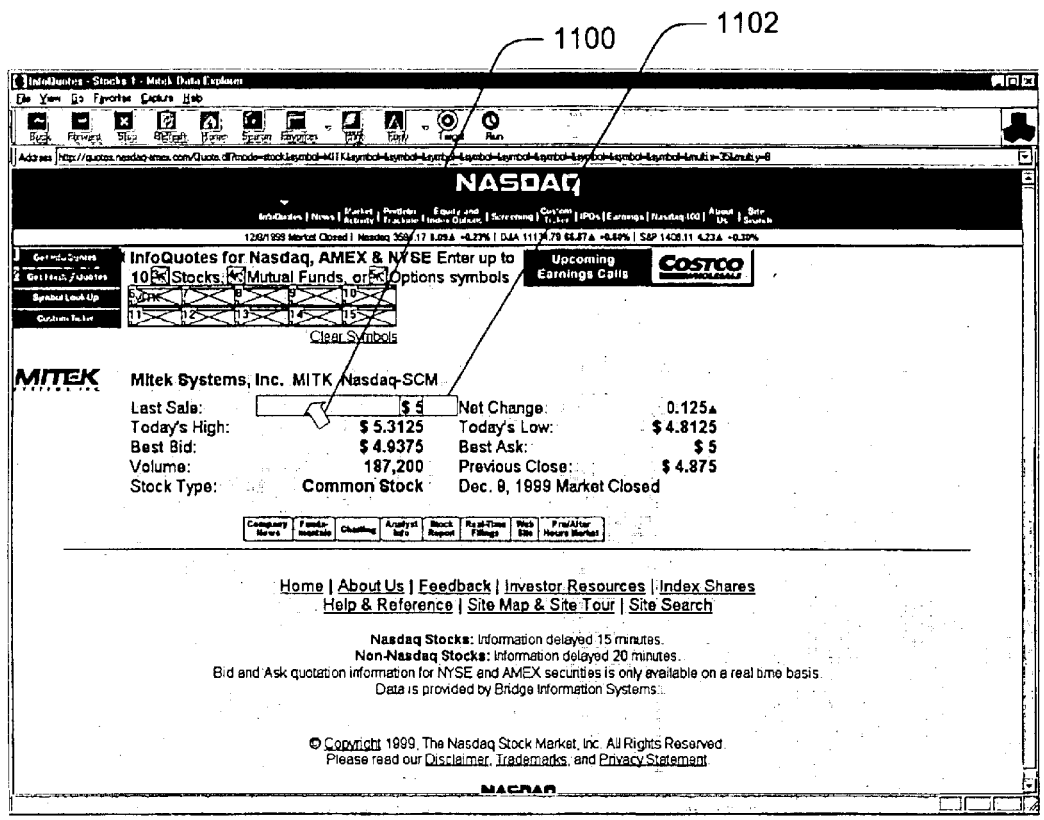
FIG. 11 shows one embodiment of a user interface targeting mode, isolating element.
Figure 12:
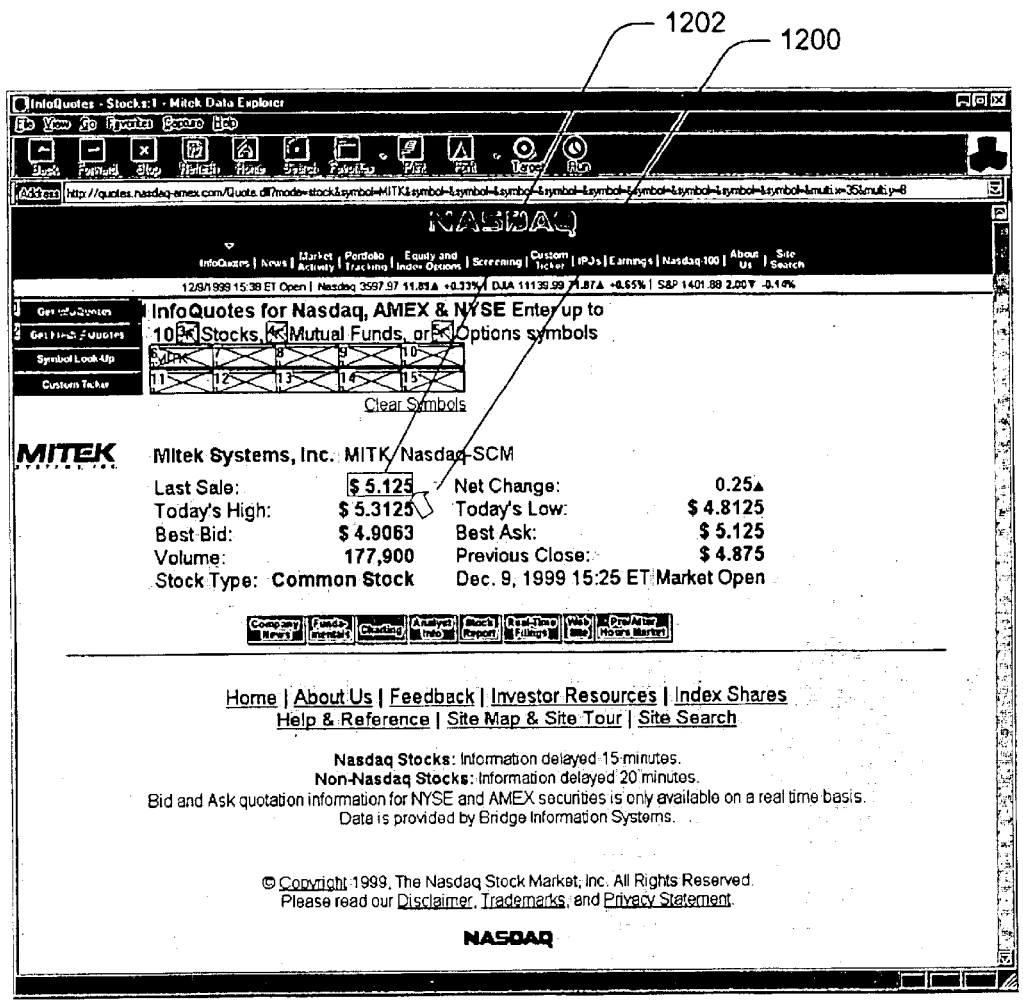
FIG. 12 shows one embodiment of a user interface targeting mode, isolated element.
Figure 13:
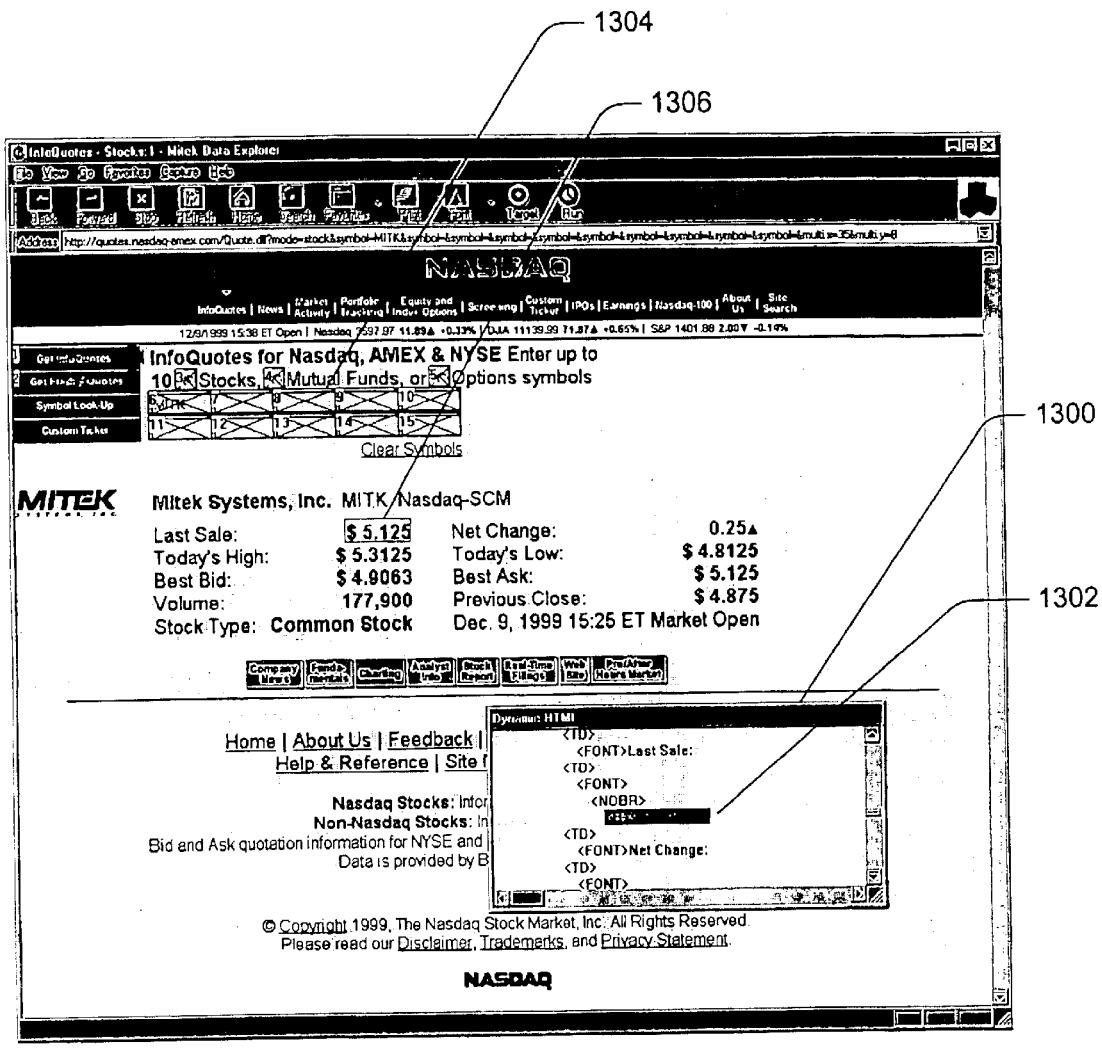
FIG. 13 shows one embodiment of a user interface target mode, dynamic HTML.

FIG. 10 shows an example where the cursor 1000 is positioned in the topmost body element. The cursor in this position outlines all of the HTML elements. When the user moves the cursor 1100 toward the desired target element 1102, outlines of elements that could not be associated with the cursor position are removed as shown in FIG. 11. Once the user positions the cursor 1200 to outline the desired element 1202 (FIG. 12), a selection can be made to change the outline color and open the dynamic HTML dialog window 1300 shown in FIG. 13. The selection 1302 can be made with a click of a pointing device such as a mouse. One or more of the selected target elements 1304 are marked and numbered as shown.

Figure 14:
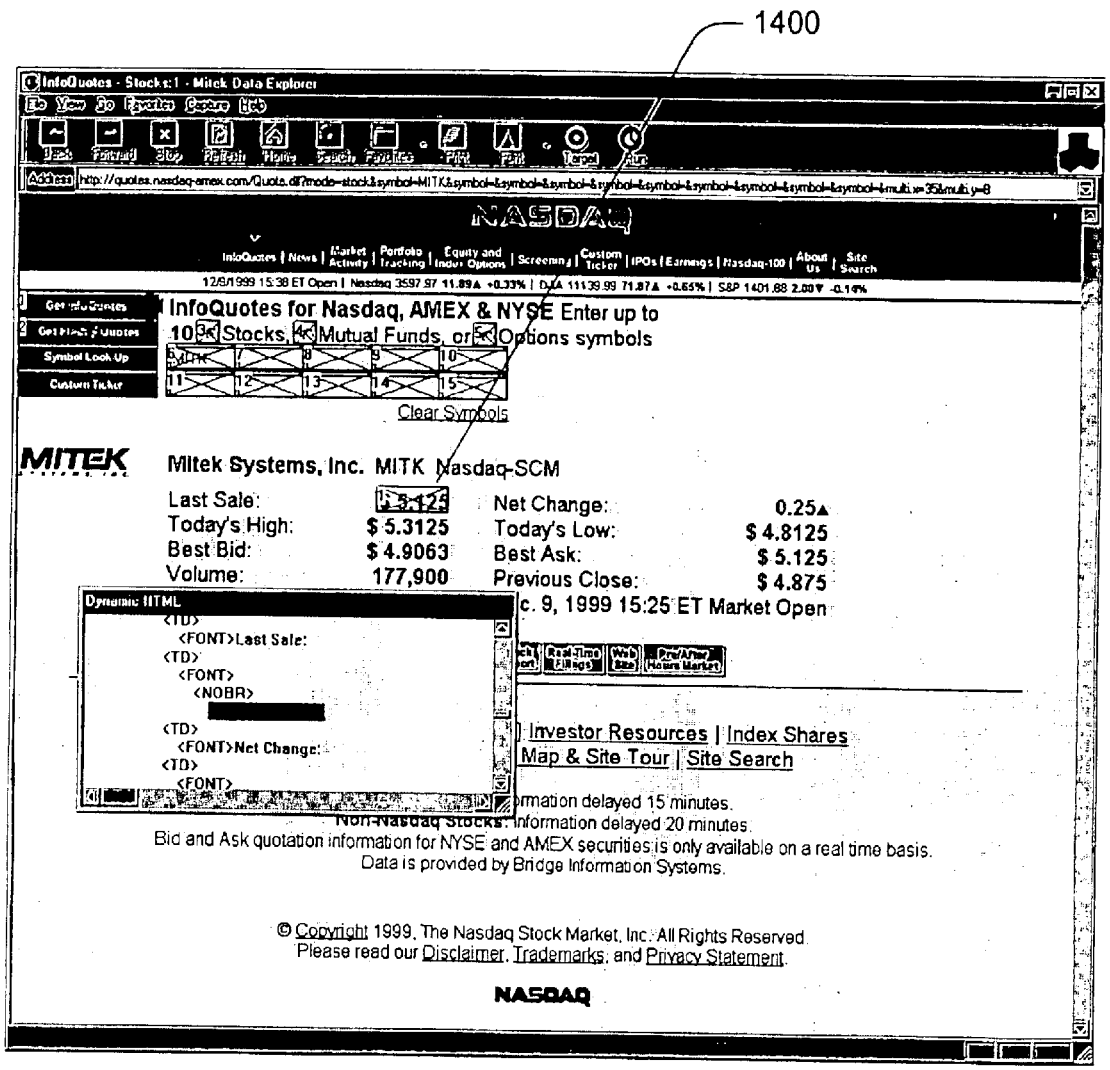
FIG. 14 shows one embodiment of a user interface target mode, text target selected.

In an illustrated embodiment of the dynamic HTML dialog window 1300, a window driver generates a color coded, indented view of the underlying HTML data. The driver then scrolls to the target element and highlights the corresponding HTML tag and associated inline data 1302. This step is sometimes required because the desired target element 1306 may be ambiguous on the browser view. For example, a bitmap on the browser may be both an image element (<IMG> in HTML) and an hyperlink element (<A> in HTML). If the user clicks on an HTML tag 1302, the corresponding data element will be identified and added to the target list. Further, the dynamic HTML tag highlight color can be changed, the browser view element outline color can be changed, and the new target element 1400 can be marked and numbered on the browser view as shown in FIG. 14.

Figure 15A:
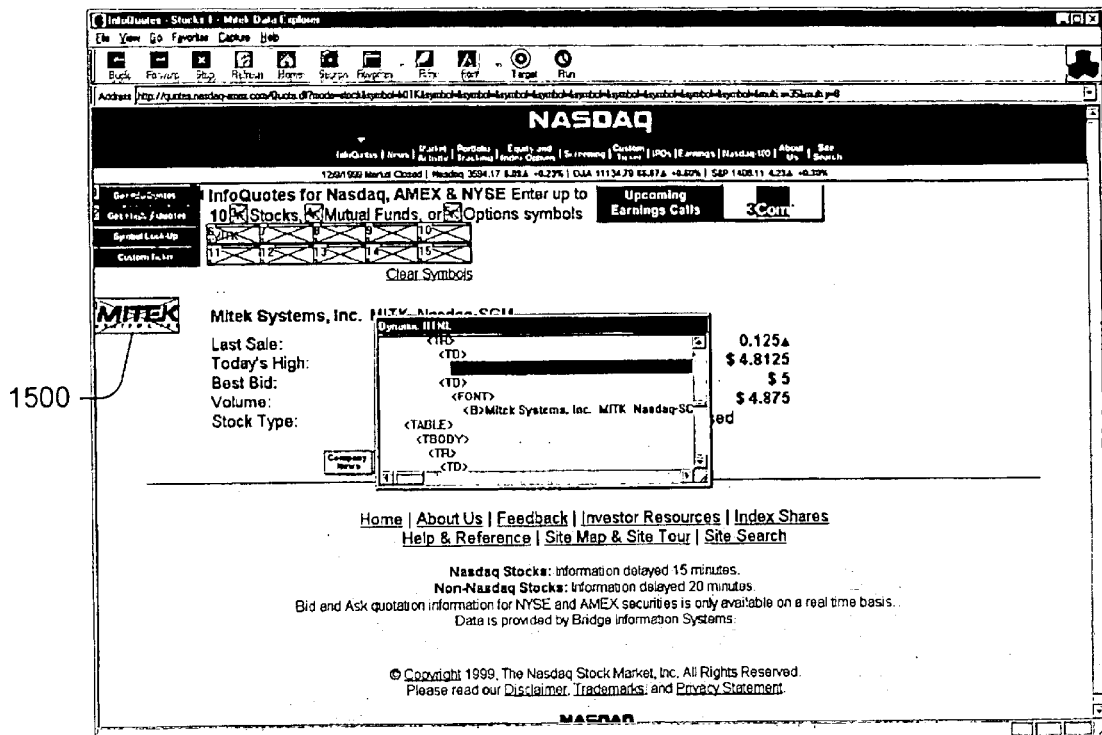
FIG. 15A shows one embodiment of a user interface target mode, image target selected.
Figure 15B:
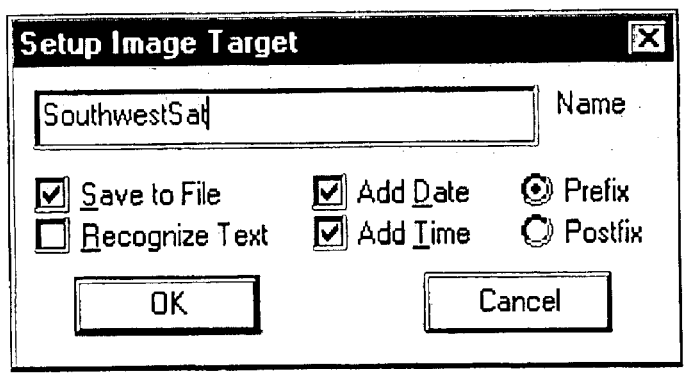
FIG. 15B shows one embodiment of a graphical target image element specification window.
Figure 25:
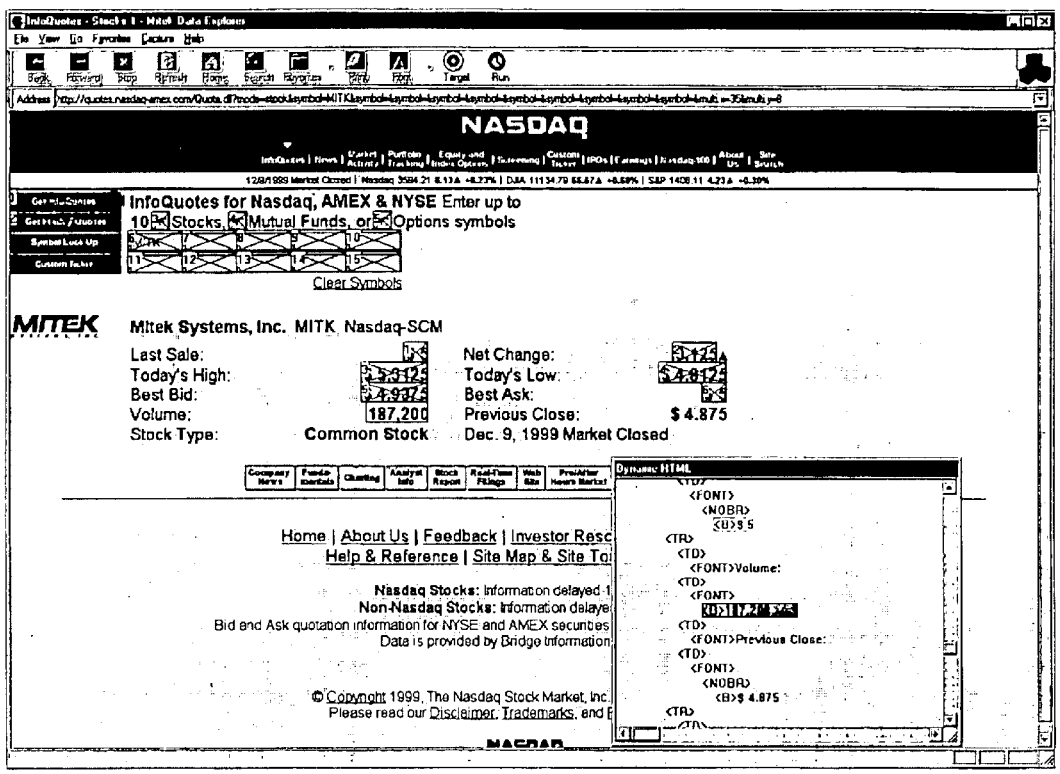
FIG. 25 shows one embodiment of a user interface target mode, multiple target selected.
Figure 26:
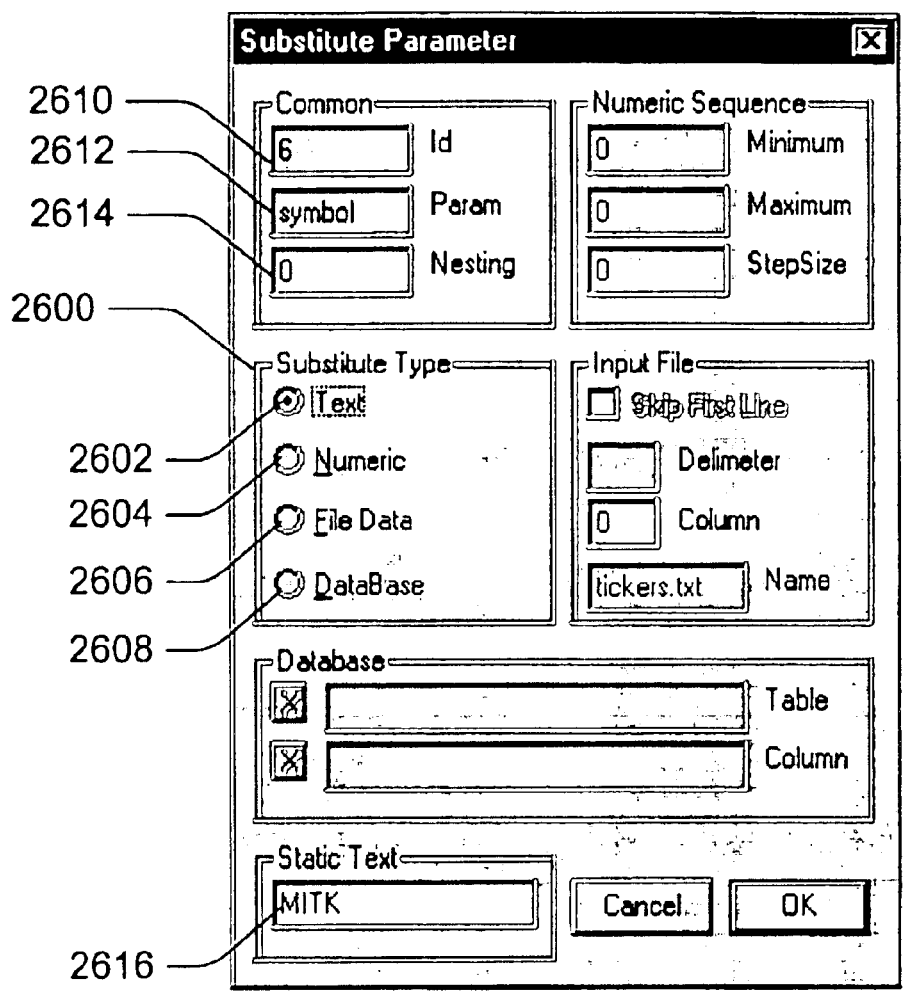
FIG. 26 shows one embodiment of a substitute parameter dialog, type text.
Figure 27:
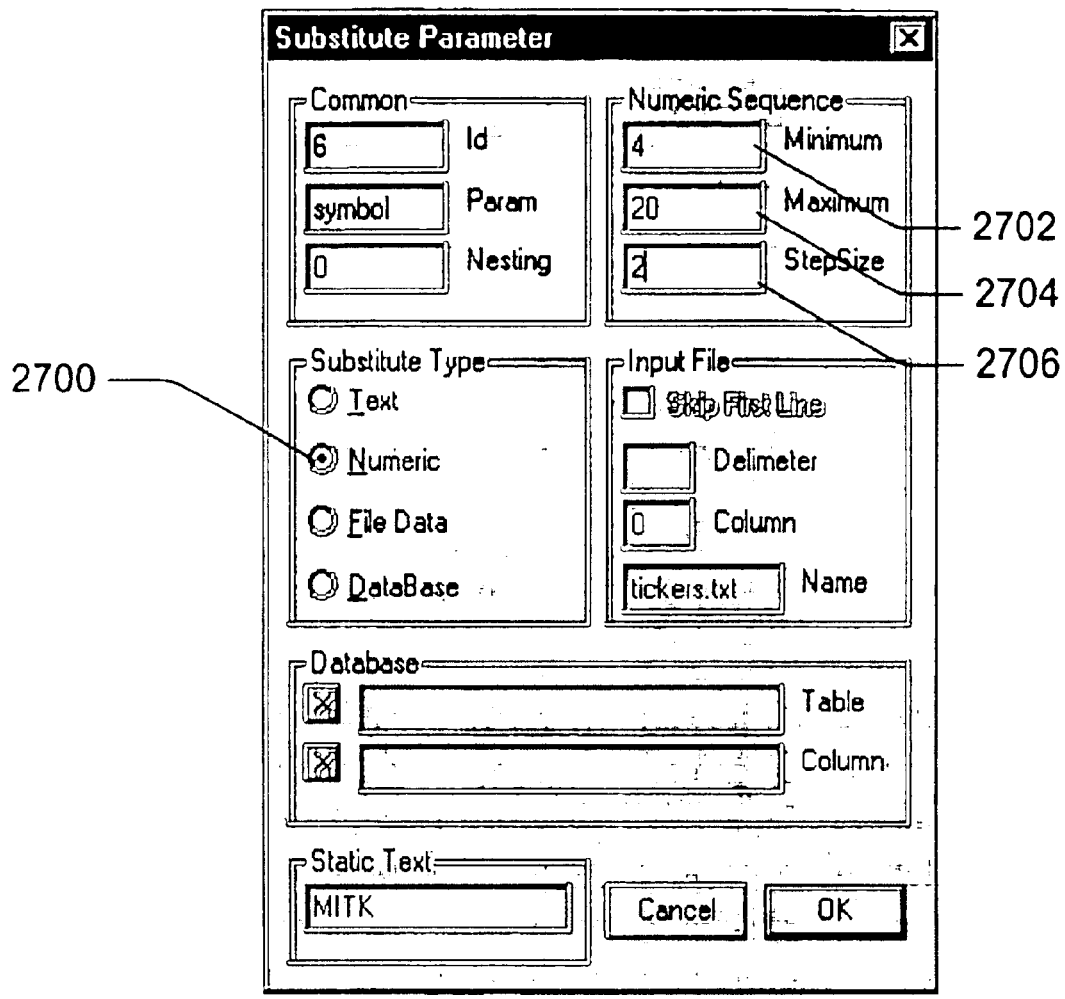
FIG. 27 shows one embodiment of a substitute parameter dialog, type numeric.
Figure 28:
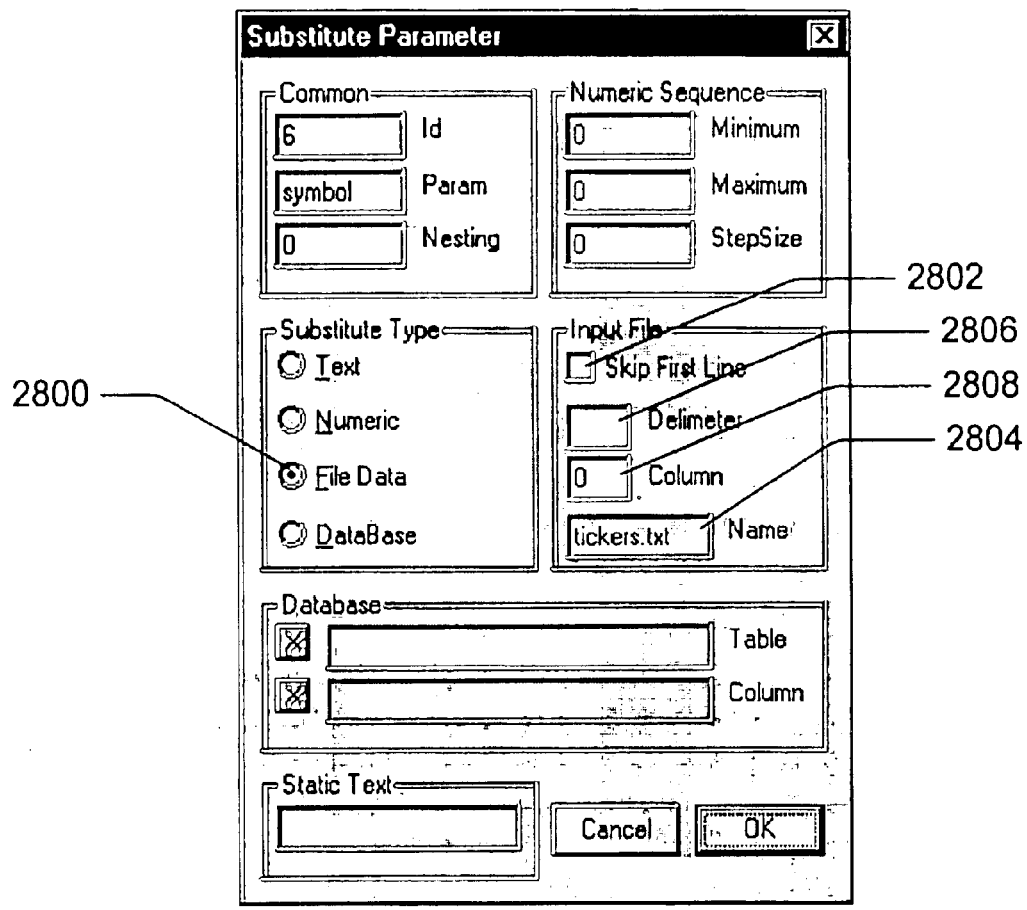
FIG. 28 shows one embodiment of a substitute parameter dialog, type file.
Figure 29:
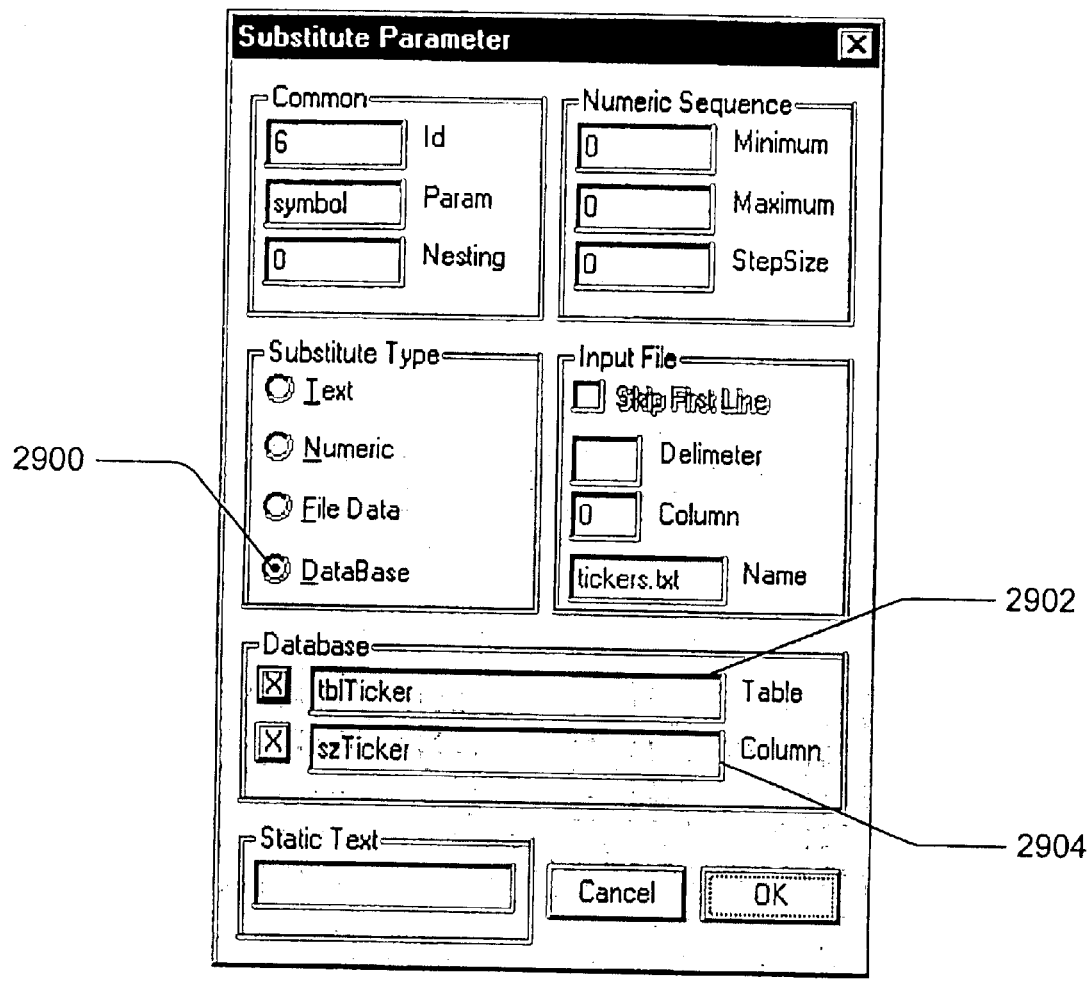
FIG. 29 shows one embodiment of a substitute parameter dialog, type database.

FIG. 15A shows a graphical image element 1500 being selected. The graphical target image element 1500 can be specified through a window as shown in FIG. 15B. This point and click target selection process can be repeated as many times as necessary to setup all the data targets for a particular URL as illustrated in FIG. 25.

As each target is selected, a style sheet dialog is displayed to provide access to the Targets (FIG. 16A), Parameters (FIG. 17), and Times (FIG. 18) property sheets. When the user enters the data capture setup information, the dialog driver automatically stores the user-supplied information. The driver saves the information upon exiting the application. When the application is entered again, the saved information is automatically reloaded. The setup information for each URL is associated with a corresponding instance of the data capture engine.

Figure 16A:
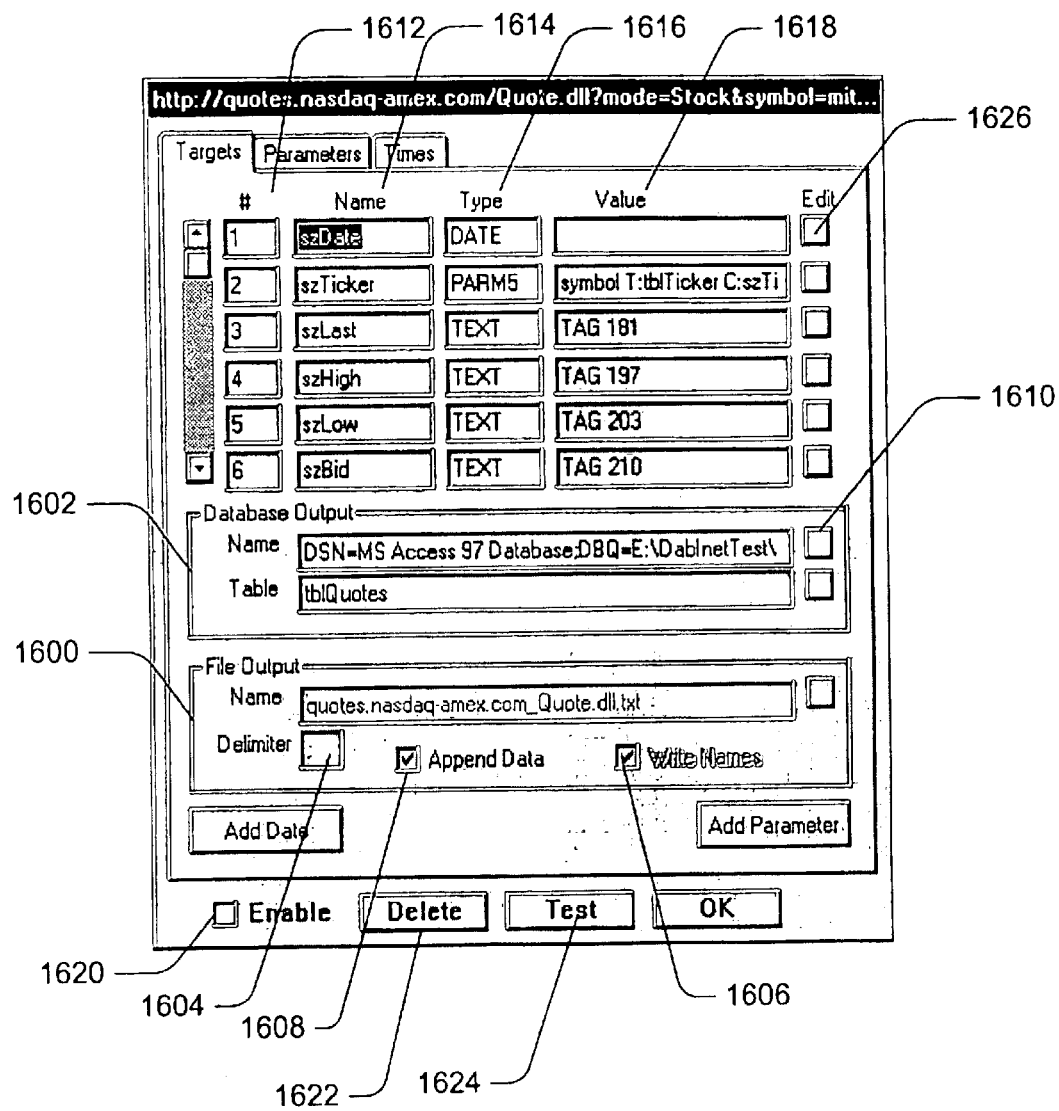
FIG. 16A shows one embodiment of a targets property page.
Figure 22:
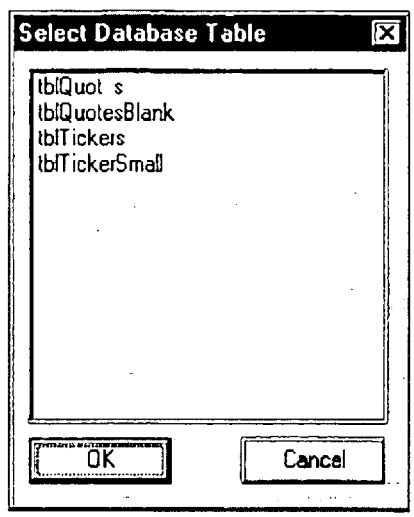
FIG. 22 shows one embodiment of a select database table dialog.
Figure 24:
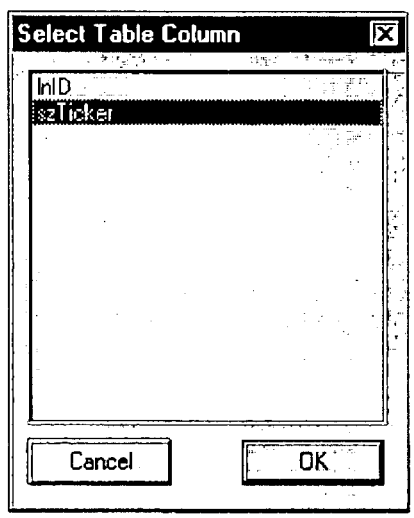
FIG. 24 shows one embodiment of a select table column dialog.
Figure 23:
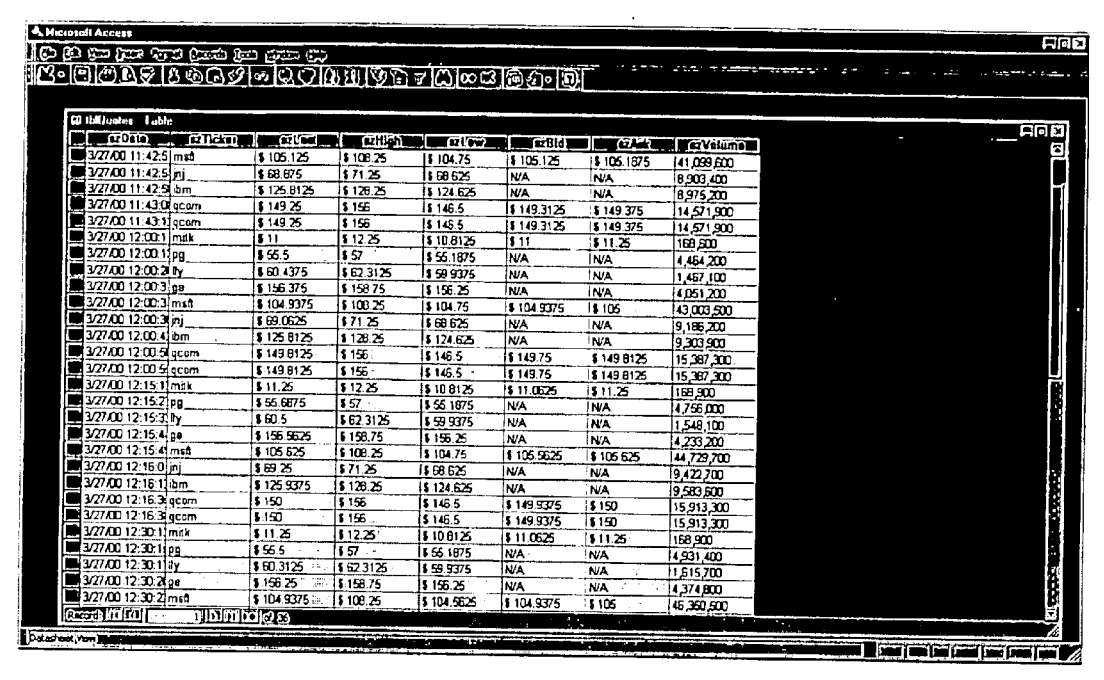
Figure 31:
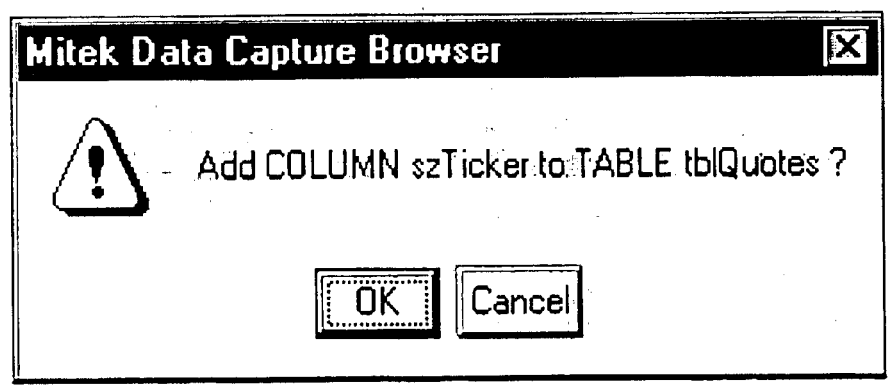
FIG. 31 shows an example of a dialog box confirming the creation of a column in a table.

An example of the Target property sheet, shown in FIG. 16A, allows the user to select the data storage mode, and to view and edit the individual data targets. During subsequent execution of the data capture engine, the captured data can be stored into formatted data files 1600, or written directly into a database 1602. The File Output section 1600 of the Target property sheet allows the user to select the output file name. The section also allows the user to select the record delimiter 1604 inserted between data items, to select whether the target names are written as the first line of the output file 1606, and to select whether output will be written to a new file or appended to an existing file 1608. The Database Output section 1602 of the Target property sheet allows the user to setup the output from the data capture engine to be written directly into a database. The Edit Name button 1610 will display the Select Data Source dialog (FIG. 20), which allows the user to select the database type. After the user selects a database type, the Select Database dialog (FIG. 21) is displayed to allow the user to locate and select a specific database. Once the user selects a database, the Select Database Table dialog is then displayed to allow the user to select a particular table from the database (FIG. 22). FIG. 23 shows a snapshot of the database. FIG. 31 shows an example dialog box confirming the creation of a column in a database table.

Figure 16B:
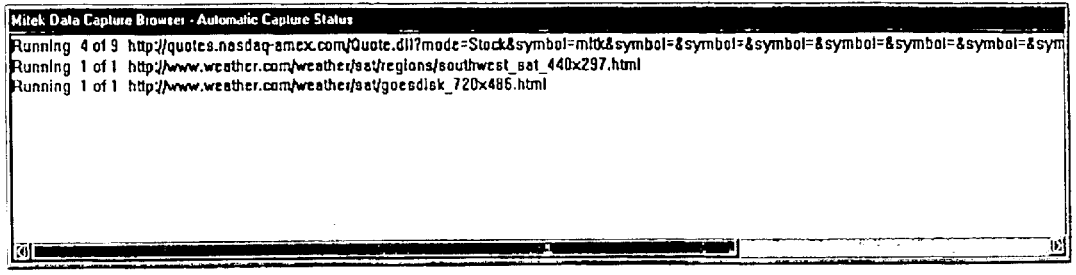
FIG. 16B shows one embodiment of a data capture process running.
Figure 16C:
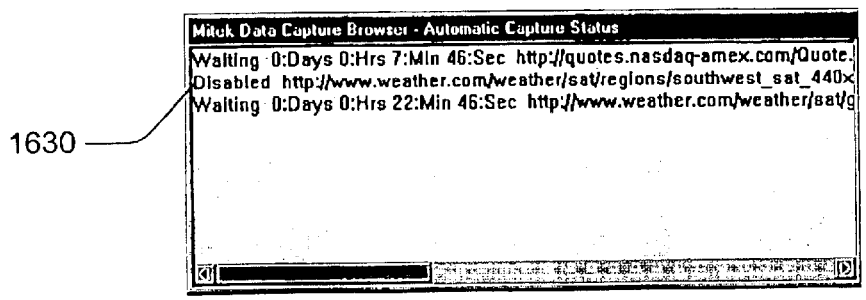
FIG. 16C shows one embodiment of an automatic data capture being disabled.
Figure 16D:
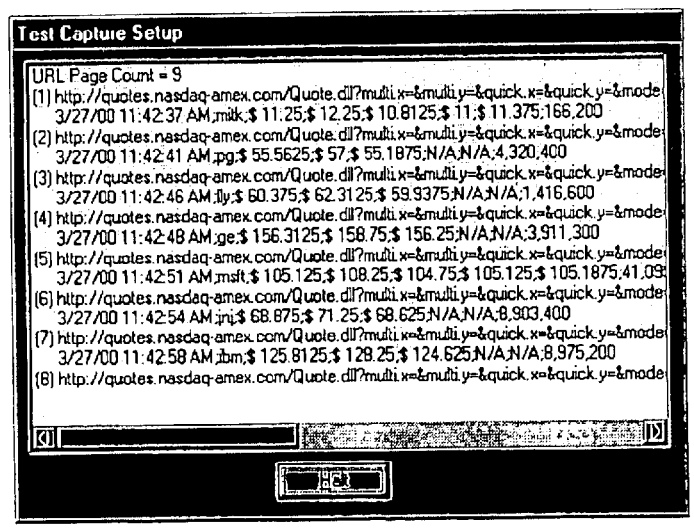
FIG. 16D shows one snapshot of a test capture setup window.
Figure 17:
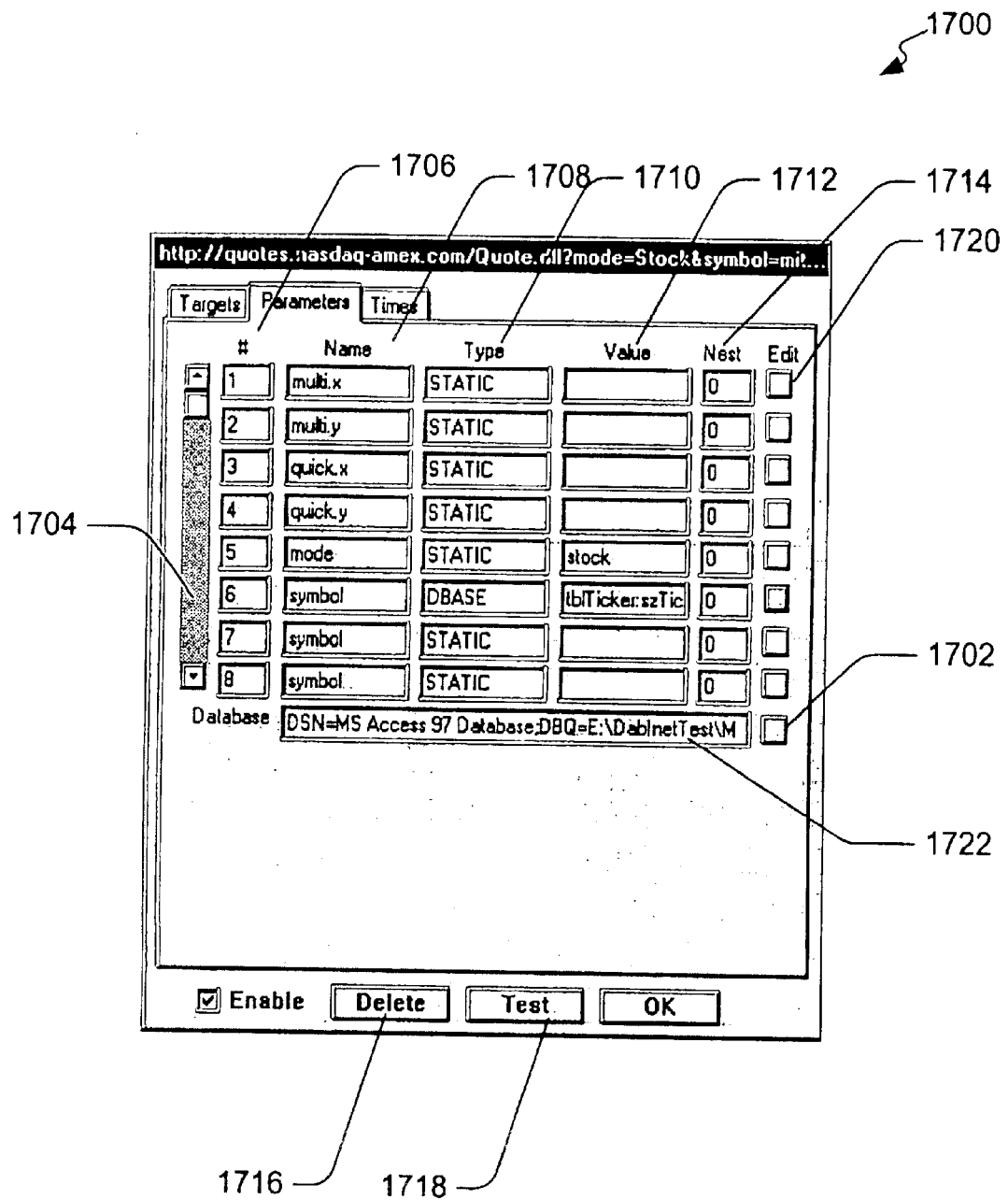
FIG. 17 shows one embodiment of a parameters property page.
Figure 18:
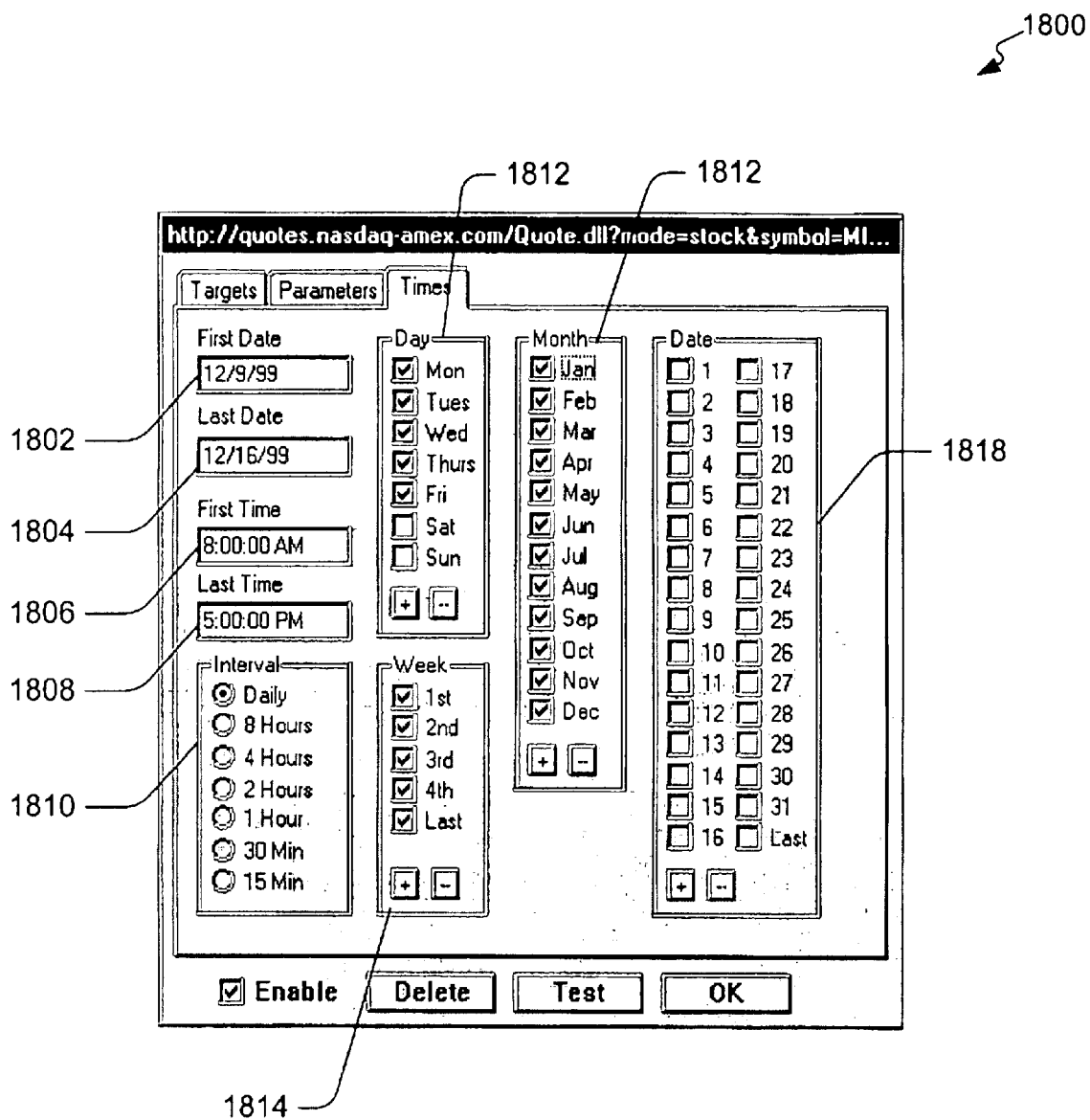
FIG. 18 shows one embodiment of an execution times property page.
Figure 19:
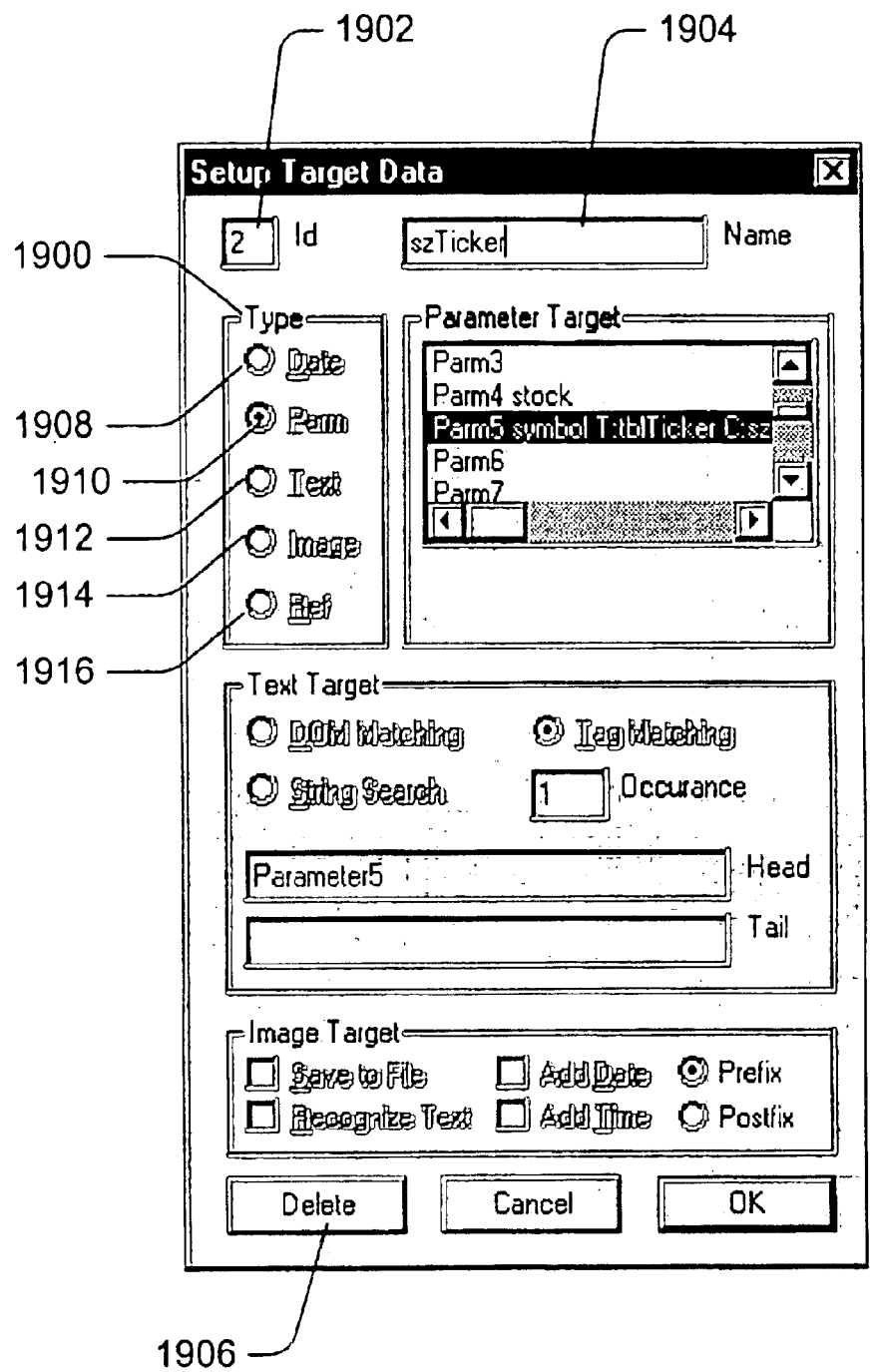
FIG. 19 shows one embodiment of a setup target dialog, type parameter.
Figure 20:
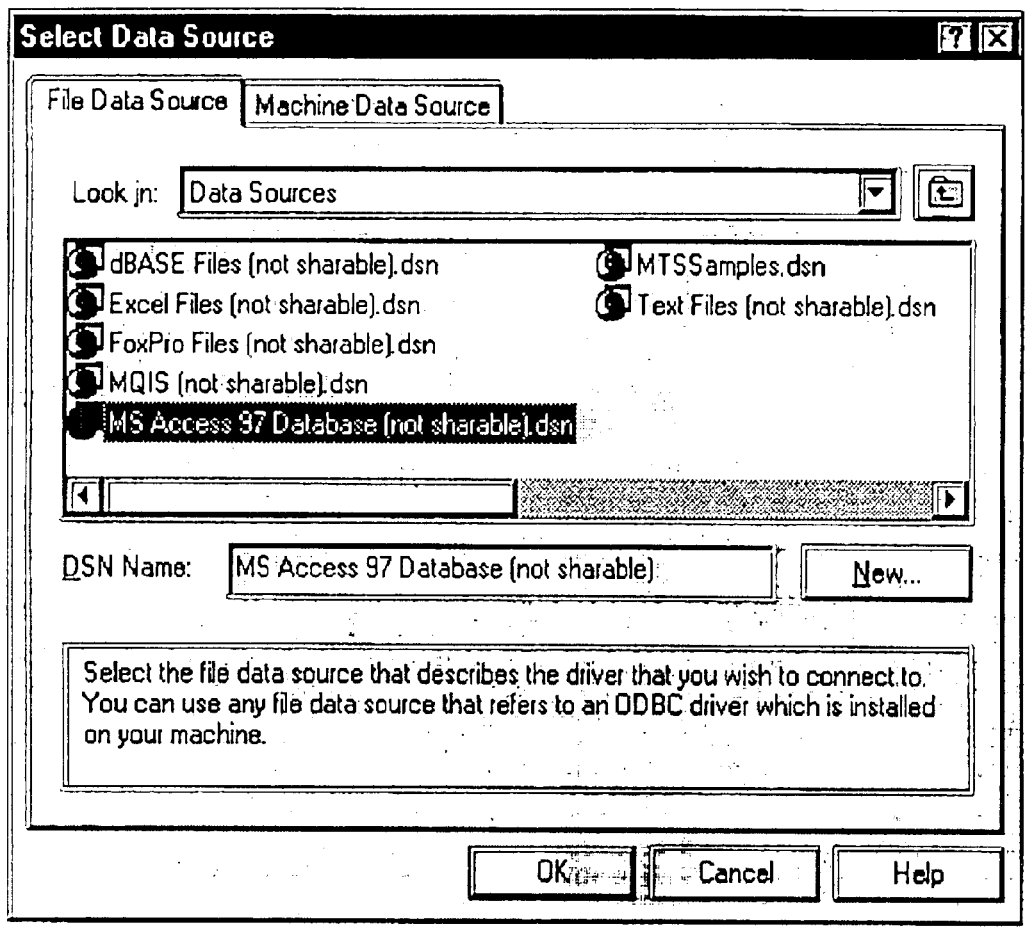
FIG. 20 shows one embodiment of a select data source dialog.
Figure 21:
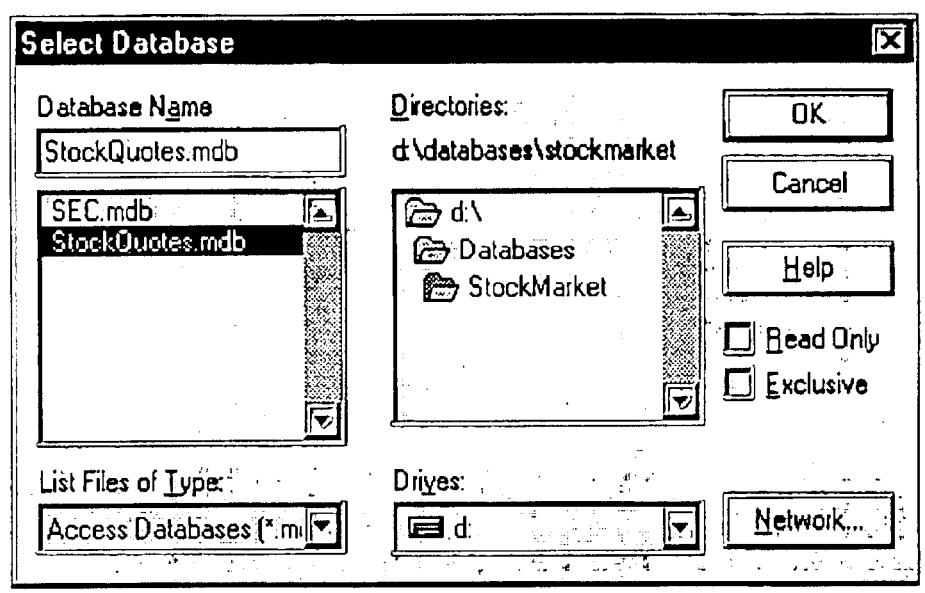
FIG. 21 shows one embodiment of a select database dialog.

During subsequent execution of the data capture engine, the captured data will be automatically formatted and written into the selected database table. Individual data targets are displayed in a scrollable list in the Targets property sheet along with their corresponding Identification numbers 1612, Names 1614, Types 1616, and Values 1618. The Enable check-box 1620 can be used to control data retrieval from this particular URL during subsequent execution of the data capture engine. When the Enable check-box 1620 is enabled, the automatic data capture runs as shown in FIG. 16B. If the box 1620 is disabled (i.e. the box is not selected), the automatic data capture is disabled 1630 as shown in FIG. 16C. The Delete button 1622 can be used to remove all data Targets from the Target list. The Test button 1624 causes the data capture engine to execute immediately, and allow validation of correct data target setup. See FIG. 16D for a snapshot of a test capture setup window. The Edit button 1626 associated with each data target will display the Setup Target dialog as illustrated in FIG. 19.

Output data items 1900 can be of different types, with 'Date' and 'Parm' targets being generated during the execution of the data capture engine, and with Text, Image, and Reference targets being extracted from the retrieved data. The Target radio buttons are used to select the desired Target type, which enable and disable various portions of the Setup Target dialog. The Id 1902 and Name 1904 boxes display the Target Id and Target Name, and the Delete button 1906 can be used to remove the target from the Target list. 'Date' targets 1908 store the date and time the data was retrieved from the servers. 'Parm' targets 1910 store the value of the input elements sent to the server to retrieve an individual data set. Since the values of the input elements may change during parameter substitution (FIG. 7), it may be desirable to store specific input values for each data set retrieved. Text targets 1912 store the corresponding text elements. Image targets 1914 will retrieve the bitmap associated with the image element, which is normally a BMP or JPEG image. The retrieved bitmap can be saved as a separate file, or written to the database. Reference targets 1916 are additionally identified pieces of text used during the tag matching process.

Figure 30:
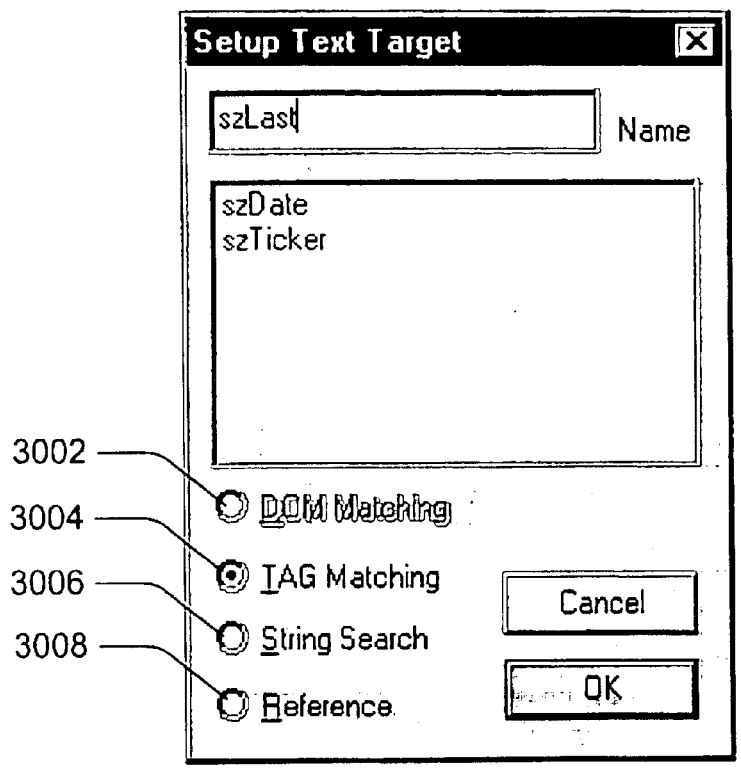
FIG. 30 shows one embodiment of a text target recognition dialog box.

If a character recognition engine is available the bitmap is preprocessed to be compatible with the recognition engine, and sent to the recognition engine. The results from the recognition engine are retrieved, post-processed, and stored. Text targets are located in the retrieved data using character sequence bounding, dynamic tag string matching, or dynamic document object model (DOM) tree matching. FIG. 30 shows a text target recognition dialog box. The dialog box provides radio buttons for each one of the text target retrieval methods.

The radio button 3002 selects the dynamic document object model (DOM) tree matching method. This method creates a document object model representation of the retrieved data, removes the text nodes, and saves the resulting document object model template for subsequent use by the data capture engine. As each data set is retrieved from the server, a temporary document object model representation is created and compared against the stored document object model template using standard N-tree matching method. Insertions, deletions and modifications of document object model nodes are located and used to identify the most likely document object model node associated with the data target. The corresponding text node is extracted and stored.

The radio button 3004 selects the dynamic tag string matching method. This method creates a representation of the retrieved data by removing the inline text and saving the characters associated with the HTML tags as the tag template for subsequent use by the data capture engine. As each data set is retrieved from the server, a temporary tag string representation is created and compared against the stored tag template using standard string matching methods. Insertions, deletions and modifications of individual tag strings are located and used to identify the most likely HTML tag associated with the data target. The inline text between the identified HTML tag and the subsequent HTML tag is extracted and stored.

The radio button 3006 selects the character sequence bounding method. This method uses sequences of characters as header and tail strings, and an occurrence value. The bounding method searches for the retrieved data for the header string, until the proper occurrence is found, then starting from the proper header searches for the tail string. The inline text between the found header and tail strings is extracted and stored.

The radio button 3008 selects the reference target. The reference target is a piece of text that remains constant from page to page. The reference targets are used during the tag string matching process. The reference targets allow data targets to be located and identified so that if additional HTML elements are inserted into or deleted from a page, existing data targets can be extracted without ambiguity.

Nested parameter substitution is a method that allows the retrieval of multiple data sets from a single URL. It is common for HTML or XML data returned from a server to contain data that is dependent upon parameters sent to the server. In some situations, the parameters may be sent to the server as part of a URL text string. In other situations, the parameters are associated with input elements contained in the HTML or XML data. A browser often displays input elements of HTML data as edit-boxes, checkboxes, radio-buttons or push-buttons that the user can affect. The <FORM method="post"> and <FORM method="get" > elements are the most common way in which variable data sets can be retrieved from a server. Typically, when processing a <FORM method="get"> element, the browser will create a formatted parameter list from the input element values, and append the parameter list to the URL. For example, in the following URL, the portion of the URL string starting with the question-mark character is a parameter string.

"http://quotes.nasdaq-amex.com/Quote.dll?mode=stock&symbol=GE&symbol=&symbol=&symbol=&symbol=&symbol=&symbol=&symbol=&symbol=&symbol=&multi.x=35&multi.y=8"

The parameter string is composed of a series of sub-strings with the following format: "&name=value". For example, if in the above URL the parameter value "GE" is replaced with "IBM", then the server would return a stock quote for IBM instead of General Electric. Parameter substitution is a technique for automatically changing any or all of the input element values. Typically, when processing a <FORM method="post">element, the browser will not create a formatted parameter list, but will internally modify the input element values and submit them to the server. The data capture system according to the first aspect of this invention uses parameter string creation, and therefore, cannot handle <FORM method="post">elements. The method used by the second aspect modifies the input element values and can process both <FORM> types. However, the method of parameter substitution is not restricted to URL parameter string creation or input element value modification. Parameter substitution is the technique of automatically changing parameter values, regardless of what they are called or how they are sent to the server. The change is made with the intent of retrieving variable data sets from a server. Nested parameter substitution is an improvement of the parameter substitution method that allows sets of parameters to be generated using constructs similar to nested FOR loops found in most programming languages (FIG. 7).

The Parameters property sheet 1700 (FIG. 17) allows the user to select the parameter substitution data source, and to view and edit individual substitution parameters. The Database edit-box 1722 displays the currently selected database that can be used during parameter substitution. The Edit Database button 1702 will display the Select Data Source dialog (FIG. 20), which allows the user to select the database type. After the user selects a database type, the Select Database dialog (FIG.21) is displayed which allows the user to locate and select a specific database. Individual substitution parameters 1704 are displayed in a scrollable list in the Parameters property sheet 1700 along with their corresponding Identification numbers 1706, Names 1708, Types 1710, Values 1712, and Nest levels 1714. The Delete button 1716 can be used to reset all input parameters to type STATIC and restore their original values. The Test button 1718 causes the data capture engine to execute immediately to enable validation of correct parameter substitution setup. The Edit button 1720 associated with each substitution parameter will display the Setup Parameter dialog (FIGS. 26–29).

The substitution parameter (FIG. 26) can be of different types 2600, with Text 2602 and Numeric 2604 parameter values being generated during the execution of the data capture engine, and with File 2606, and Database 2608 parameter values being extracted from the appropriate data source as required. The Substitute Type radio-buttons 2600 are used to select the desired substitution type, and enable and disable various portions of the Setup Parameter dialog. The Id 2610, Parm 2612 and Nesting 2614 edit-boxes display the Parameter Id and Parameter Name, and the Parameter Nesting level.

Text parameters 2602 are character strings that are held constant during the parameter substitution process. The value of a Text parameter 2602 can be kept at the original value, or can be modified using the Static Text edit-box 2616.

Numeric parameters 2700 (FIG. 27) are dynamically created sequences of numbers. The first numeric value is entered in the Numeric Sequence Minimum edit-box 2702. The maximum allowable numeric value is entered in the Numeric Sequence Maximum edit-box 2704. The difference between successive numeric values is entered in the Numeric Sequence Step Size edit-box 2706. Numeric parameter values are generated during execution of the data capture engine by starting with the Minimum value, increasing the value by the Step Size for each parameter set created, and halting when the Numeric value is greater than or equal to the Maximum allowable value.

File data parameters 2800 (FIG. 28) are character strings that are extracted from a formatted text file, starting with the first value string that satisfies the extraction criterion, and stopping when the last valid value string has been extracted. The Input File Skip First Line check-box 2802 selects whether the first line of the parameter string file will be ignored. This capability is useful if the first line of the input file contains the parameter names or other header information. Moreover, the input parameter file can be an output file created by the data capture engine, this capability to directly use previously captured data is a powerful extension of the parameter substitution method. In this embodiment, the input parameter file is a plain text delimited file, which can be created manually or created by most common spreadsheets and databases. However, one skilled in the art could easily create implementations using alternative file formats. The Input File Name edit-box 2804 allows the user to specify the name of the input file for a particular File substitution parameter, and each File substitution parameter may use the same, or use different input files. For example, all of the File substitution parameter values for a particular URL could be extracted from a single file, or alternatively each File substitution parameter could access a separate input file. The Input File Delimiter editbox 2806 allows the user to specify the record delimiter, if any, used to separate value string fields in the input file. Common delimiters are the tab, comma, and semi-colon characters. If the input file does contain multiple fields per record, the Input File Column edit-box 2808 allows the user to specify which field from each record should be used.

Database parameters 2900 (FIG. 29) are automatically extracted from a column of a database table. Although the nomenclature may be different for various commercially available databases, most databases contain sets of tables, each table contains sets of records, and each record may contain one or more fields. Typically, the fields of the records contained in a table 2902 are organized as columns 2904. The Database Table 2902 and Database Column 2904 edit-boxes display the currently selected database table and column.

The Database Table push-button runs the Select Table dialog FIG. 22) that allows the user to select a particular table from the database. After the user selects a database table the Select Table Column dialog (FIG. 24) is displayed to allow the user to select a particular column from the database table. Although this embodiment uses a specific nomenclature and methods to access databases, one skilled in the art could easily create alternate implementations for retrieving substitution parameters. The scope and spirit of the invention encompasses all implementations that use substitution values extracted from files or databases.

The setup execution Times property sheet 1800 (FIG. 18) allows the user to configure the data capture engine to run at pre-specified dates and times. The First Date 1802 and Last Date 1804 edit boxes allow the user to specify a range of dates, execution of the data capture engine is suppressed outside the allowable date range. The First Time 1806 and Last Time 1808 edit boxes allow the user to specify a time span during the day, outside of which execution of the data capture engine is suppressed. The Interval radiobuttons 1810 allow the user to select the frequency, starting at the First Time value, with which the data capture engine will execute during pre-specified dates. Although Interval values of fixed duration have been presented to the user for selection, this is not a limitation of the execution time scheduler, but an attempt to prevent excessive use of the data capture engine by ordinary users. For example, a professional analyst may need to retrieve stock market data every few seconds, whereas fifteen-minute intervals should be sufficient for the average users. Thus, a more flexible setup execution time dialog would be appropriate for the professional user. The Day 1812, Week 1814, Month 1816, and Date 1818 sets of check-boxes provide a simple yet powerful mechanism to allow the user to select which days, during the allowable date range, periodic execution of the data capture engine will occur. As with target selection and parameter substitution, execution time information is stored independently for each URL. Thus, when automatic data collection is enabled, data from one URL may be collected every few minutes, while data from another URL may be collected only a few times a year.

Figure 32:
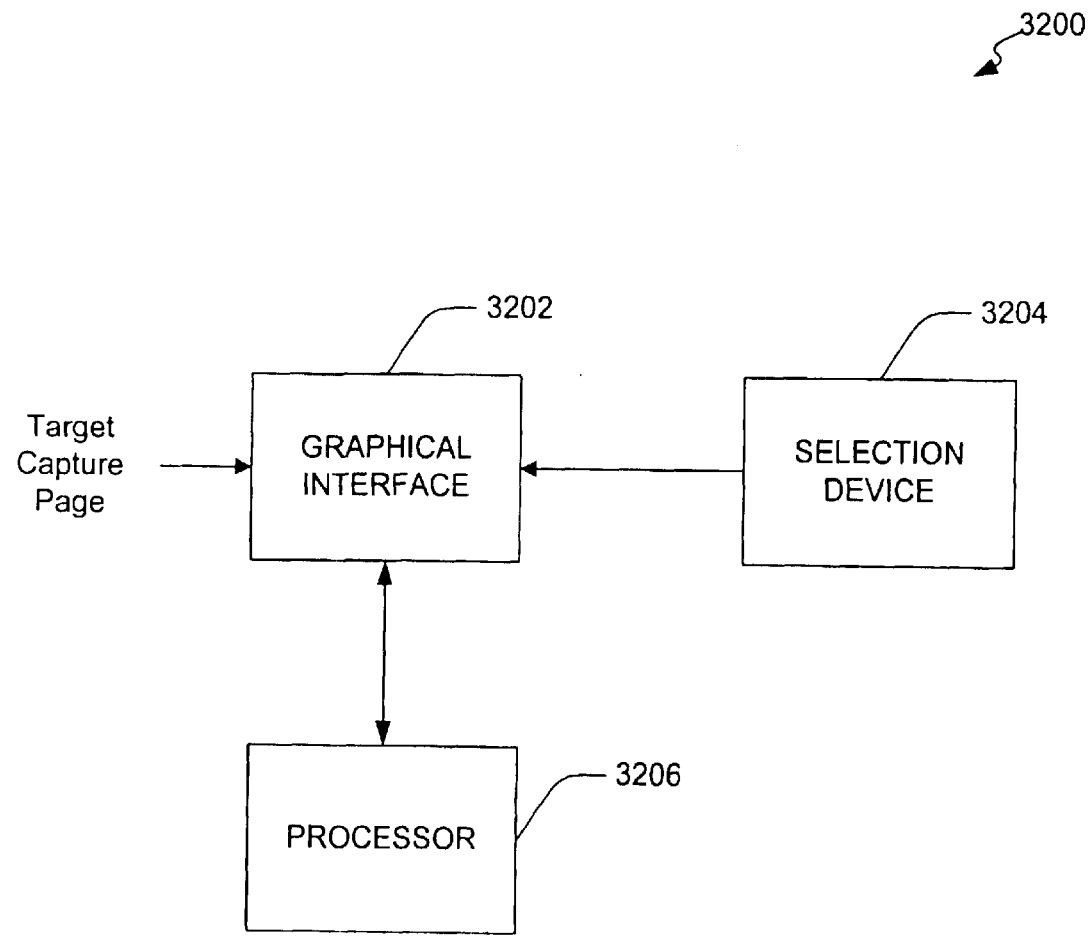
FIG. 32 is a block diagram of a data capture and storage system in accordance with one embodiment of the present invention.

FIG. 32 shows a block diagram of the data capture and storage system 3200 according to one embodiment of the present invention. The system 3200 includes a graphical interface element 3202 configured to display at least one target page. The system 3200 also includes a selection device 3204 and a processor 3206. The selection device 3204 enables selection of target data for capture and storage. The processor 3206 is coupled to the graphical interface element 3202. The processor 3206 is capable of being programmed with a plurality of configurations to locate, extract, and store the target data according to the plurality of configurations.

In one embodiment, the graphical interface element 3202 is an existing web browser used to display the target page with added features to enable target data capture. The selection device 3204 can be a mouse or a track ball. The processor 3206 may include a receiving element configured to receive a current date and time. Thus, the processor 3206 can capture the target data from the target page when the current date and time matches a specified next capture date and time.

While specific embodiments of the invention have been illustrated and described, it will be obvious to those skilled in the art that various changes and modifications may be made without sacrificing the advantages provided by the principles disclosed herein. Accordingly, the invention may be embodied in other specific forms without departing from its spirit or essential characteristics. The detailed embodiment is to be considered in all respects only as illustrative and not restrictive. All changes that come within the meaning and range of equivalency of the claims are to be embraced within their scope.

What is claimed is:

1. A method for specifying, capturing, locating, extracting and storing data from a network, comprising: specifying at least one target datum accessible from a network location addressable by a network address; generating one or more sets of input parameters, wherein said "input parameters" normally refers to hypertext markup language (HTML) or extensible markup language (XML) <INPUT> elements and <FORM method="get"> or <FORM method="post">elements, or to variables within <SCRIPT> elements, allowing capture of one or more sets of network data from said network location; capturing one or more sets of said network data from said network location at specified dates and times; locating at least one said target datum in variable format sets of said network data, wherein said "variable format" normally refers to possible insertions or deletions of HTML or XML elements as well as variable text strings; extracting at least one said target datum from said variable format sets of said network data; and storing at least one said target datum in a file, a database, or any storage medium. Wherein said capturing from said network location further comprises substitution of said input parameters to generate one or more sets of said input parameters and repeatedly capturing from said network location for each set of said input parameters. Wherein performing said substitution of said input Darameters further comprises said substitution of one or more nested said input parameters, wherein said "nested" has a similar meaning as in "nested FOR loops" such that variables within inner FOR loops run through their entire range of values for every value of a variable in an outer FOR loop, wherein said substitution of one or more said nested said input parameters includes generating one or more sets of said input parameters, where each of one or more sets of said input parameters may provide different target data from said network location.

2. The method of claim 1, wherein said network is an Internet and said network location corresponds to a web page.

3. The method of claim 1, wherein said specifying at least one target datum includes a graphical interface, wherein said graphical interface may include or be part of a web browser.

4. The method of claim 1, wherein said specifying at least one target datum further comprises: specifying data capture times including, but not limited to, starting dates, starting times, ending dates, ending times, months of the year, weeks of the month, days of the month, days of the week; and storing the specifications of said data capture times in a file, a database, or any storage medium.

5. The method of claim 1, wherein said specifying at least one target datum further comprises setting up to perform substitution of said input parameters, wherein said "substitution" normally refers to the creation of sets of values for <INPUT> elements or <SCRIPT> variables, wherein said setting up to perform said substitution of said input parameters includes: parsing URL strings to locate and identify said input parameter names and types; locating and extracting <INPUT> elements from HTML or XML data; specifying said input parameter types and said input parameter values; and storing the specifications of said input parameters in a file, a database, or any storage medium.

6. The method of claim 5, wherein said input parameter values are: static text strings; or automatically generated numeric sequences; or retrieved from a file; or retrieved from a database; or retrieved from any storage medium.

7. The method of claim 1, wherein said specifying at least one target datum further comprises: specifying target data types, wherein said target data types include, but are not limited to, text, hypertext, hyperlinks, date or time values, input parameter values, invariant reference data, image or graphical data; and storing specifications of said target data types in a file, a database, or any storage medium.

8. The method of claim 1, wherein said specifying at least one target datum further comprises setting up to perform dynamic document object model (DOM) tree matching, wherein said setting up to setting up to perform dynamic DOM tree matching includes: capturing one or more sets of said network data from said network location; extracting HTML or XML elements from said network data; generating a reduced DOM template of said network data using extracted HTML or XML elements, wherein said "reduced" normally refers to the removal text strings or other data contained within said network data that may change each time said network data is captured from said network location; and storing said reduced DOM template in a file, a database, or any storage medium.

9. The method of claim 1, wherein said specifying at least one target datum further comprises setting up to perform dynamic tag string matching, wherein said setting up to perform dynamic tag string matching includes: capturing one or more sets of said network data from said network location; extracting HTML or XML elements from said network data; generating a reduced tag string template of said network data using extracted HTML or XML elements, wherein said "reduced" normally refers to the removal text strings or other data contained within said network data that may change each time said network data is captured from said network location; and storing said reduced tag string template in a file, a database, or any storage medium.

10. The method of claim 1, wherein said at least one target datum is extracted from said variable format said network data using: character sequence bounding; or dynamic DOM tree matching, wherein said dynamic DOM tree matching includes creating a said reduced DOM tree representation from said network data, comparing said reduced DOM tree representation with previously stored said reduced DOM tree template to identify most probable location within said network data of said target datum, and extracting said target datum from said most probable location within said network data; or dynamic tag string matching, wherein said dynamic tag string matching includes creating a said reduced tag string representation from said network data, comparing said reduced tag string representation with previously stored said reduced tag string template to identify most probable location within said network data of said target datum, and extracting said target datum from said most probable location within said network data.

11. The method of claim 10, wherein said dynamic tag string matching or said dynamic DOM tree matching further comprises using invariant reference data to increase robustness of location and extraction of said at least one target datum, wherein said "invariant reference data" normally refers to text strings or other data contained within said network data that does not change each time said network data is captured from said network location.

12. The method of claim 1, wherein said extracting said at least one target datum further comprises: locating and extracting possible text blocks from unconstrained color images; performing character recognition on possible text blocks; filtering the recognized text; and storing the filtered text in a file, a database, or any storage medium.

13. The method of claim 1, wherein said capturing one or more sets of network data further comprises using a watchdog timer to detect hung data capture attempts, and said hung data capture attempts are automatically aborted and reattempted.

14. The method of claim 1, wherein said specifying said at least one target datum includes graphically highlighting and isolating HTML or XML elements corresponding to said at least one target datum, wherein said "graphically highlighting and isolating" normally refers to selection of any of the HTML or XML elements contained within said page data, not just to hyperlinks or text strings which may be selected with ordinary web browsers, and said graphically highlighting and isolating HTML or XML elements includes using a mouse, joystick, trackball, or any pointing device.

15. The method of claim 1, wherein said specifying said at least one target datum includes specifying input parameters values in a menu-driven graphical interface.

* * * * *